United States Patent [19]

Davidson et al.

[11] Patent Number: 4,873,717

[45] Date of Patent: Oct. 10, 1989

[54] CALL COVERAGE ARRANGEMENT

[75] Inventors: Wayne A. Davidson, Winfield; John P. Ernst, Warrenville; Marybeth Herkes, Aurora; Ram Kuppuswami, Wheaton; Timothy A. Satalich, Warrenville; John J. Stanaway, Jr., Wheaton, all of Ill.

[73] Assignee: American Telephone and Telegraph Company, AT&T Bell Laboratories, Murray Hill, N.J.

[21] Appl. No.: 206,467

[22] Filed: Jun. 14, 1988

[51] Int. Cl.[4] .............................................. H04M 3/42
[52] U.S. Cl. ..................................... 379/157; 379/164; 379/165; 379/210; 379/211
[58] Field of Search ............... 379/210, 211, 212, 213, 379/214, 218, 262, 263, 265, 226, 164, 165, 162, 163, 157, 201

[56] References Cited

U.S. PATENT DOCUMENTS

| | | | |
|---|---|---|---|
| 4,296,282 | 10/1981 | O'Neil et al. | 379/164 |
| 4,374,308 | 2/1983 | Holesha | 379/164 X |
| 4,436,962 | 3/1984 | Davis et al. | 379/265 X |
| 4,567,324 | 1/1986 | Smith et al. | 379/210 |
| 4,741,026 | 4/1988 | Baxter et al. | 379/204 |
| 4,790,004 | 12/1988 | Nalbone | 379/214 |
| 4,791,662 | 12/1988 | Ahnen et al. | 379/165 |

FOREIGN PATENT DOCUMENTS 0064561  4/1985  Japan ................... 379/164

OTHER PUBLICATIONS

AT&T System 85 Features Reference Manual, AT&T 555-102-301, Issue 1, Apr. 1986, pp. 99-1 through 99-2.
SESS® Switch ISDN Basic Rate Interface Specification 5E4 Generic Program, AT&T 5D5-900-301, Sep. 1985, pp. V-94 through V-105.

Primary Examiner—James L. Dwyer
Attorney, Agent, or Firm—Ross T. Watland

[57] ABSTRACT

A call coverage arrangement in which coverage personnel are informed of the switch-hook status of covered terminals by way of a single two-part indicator on the coverage terminal. The two-part indicator indicates switch-hook status for any one of a number of covered terminals. The first part of the indicator identifies the covered terminal and the second part defines the switch-hook status of the identified terminal. The arrangement is flexible in providing coverage for additional terminals and in providing coverage via forwarding from any termianl, since there is no need to assign and dedicate status indicators to particular terminals.

30 Claims, 15 Drawing Sheets

MEMORY 117

CALL COVERAGE ARRANGEMENT

TECHNICAL FIELD

This invention relates to telecommunication call processing, and more particularly, to call coverage arrangements in integrated services digital network (ISDN) systems.

BACKGROUND AND PROBLEM

Telecommunication arrangements for businesses encourage productivity by enabling terminals to originate and terminate calls simultaneously. For example, calls may be offered to a terminal when the user of the terminal is dialing a directory number or is active on another call. This eliminates the need for call waiting service and provides the user flexibility in choosing the call to handle next. In such an arrangement, each terminal has visual indicators, referred to as call appearances, for informing the user about the status of each call. Several, or even all, of the call appearances on a terminal may represent the same directory number. Furthermore, terminals may share call appearances. Calls alerting at a call appearance may be answered at any of the terminals that share the call appearance. However, the directory number for the call appearance is primary for at most one terminal. The concept of primary directory number associates a directory number with a terminal and the individual who uses that terminal.

Shared call appearances are often used to provide call coverage. The terminal for a secretary who answers calls for several executives would include call appearances for the secretary's primary directory number and shared call appearances for the executives' primary directory numbers. If all the call appearances on the executives' terminals appeared on the secretary's terminal, the secretary could determine whether an executive's terminal was off-hook merely by glancing at the corresponding shared call appearances. However, since each executive's terminal is likely to have multiple call appearances, putting all the call appearances on the secretary's terminal is impractical. Instead, often only one call appearance of the executive's primary directory number appears on the secretary's terminal. The problem with this is that status information for the other call appearances is not available at the secretary's terminal so the secretary does not known whether the executive's terminal is off-hook. For example, assume a call from an important client arrives for an executive and the secretary answers the call. Meanwhile, the executive is off-hook and busy with a call on a call appearance that is not displayed on the secretary's terminal. The secretary, assuming that the executive is away from the desk, merely takes a message. Although the secretary quickly relays the message to the executive, the executive is unable to reach the client and loses an important business opportunity. In contrast, if the secretary's terminal had displayed information about the executive's other call appearances, the secretary would have recognized that the executive was on the phone and could be interrupted.

Similar problems arise when using call forwarding to provide call coverage for terminals with multiple call appearances. Calls may be forwarded to terminals that do not share any call appearances with the originally called terminal. When an incoming call arrives for a terminal with a single call appearance for a given directory number while another call is active at the call appearance, the call is forwarded to a coverage terminal along with a message indicating that the called terminal is off-hook. This information is communicated to the coverage terminal user through a display field or by a special ringing sequence. However, when a terminal has multiple call appearances for a given directory number and a call arrives while only one of those call appearances is active, the message sent to the coverage terminal indicates that the call was forwarded because the call was not answered. The terminal is not considered busy because idle call appearances are available. The terminal, however, is off-hook. The coverage staff is not informed that the terminal is off-hook and could incorrectly assume that the called individual is away from the desk.

In one known arrangement, special status buttons are included on a coverage terminal for each covered terminal to indicate whether the covered terminal is off-hook. This arrangement is expensive and inflexible since it requires additional dedicated buttons on the coverage terminal and because the number of covered terminals for which switch-hook status is provided is limited by the number of dedicated buttons. Furthermore, special administrative procedures must be performed to designate a button on the coverage terminal as relating to a particular terminal. In addition, such an arrangement limits flexibility for call forwarding, since the arrangement only works for calls forwarded to terminals equipped with a status button for the forwarding terminal.

Thus, recognized deficiencies of the prior art include the inefficient call handling afforded by call coverage arrangements that fail to inform coverage personnel of the switch-hook status of covered multiple call appearance terminals and the expense and inflexibility of arrangements in which call coverage terminals are required to include call appearances for every call appearance of the covered terminals or to include additional dedicated status buttons for each covered terminal.

SOLUTION

These deficiencies are eliminated and a technical advance is achieved consistent with the principles of the invention in a call coverage arrangement in which coverage personnel are advantageously informed of the switch-hook status of covered terminals by way of a single two-part indicator on the coverage terminal. The two-part indicator indicates switch-hook status for significantly any one of a number of covered terminals. The first part of the indicator identifies the covered terminal and the second part defines the switch-hook status of the identified terminal. The arrangement is flexible is providing coverage for additional terminals and in providing coverage via forwarding from any terminal, since there is no need to assign and dedicate status indicators to particular terminals. Illustratively, call handling is further enhanced by providing additional call information at the coverage terminal such as the calling and called party names.

A call to a directory number for a covered terminal having multiple call appearances is processed in accordance with a method of the invention by determining the switch-hook status of the covered terminal and transmitting such status to a coverage terminal. The coverage terminal has a two-part indicator: the first part identifies any one of a number of terminals and the second part defines the switch-hook status of at most one terminal. In response to receipt of the switch-hook status, the coverage terminal provides an indication for use in answering the call by identifying the covered terminal with the first part of the indicator and defining the switch-hook status of the identified terminal with the second part of the indicator.

Illustratively, the coverage terminal includes an alpha-numeric display that displays the first part of the two-part indicator. When a call is alerting at the coverage terminal, an identifier is displayed in the display for use in identifying the terminal for which the call is intended. Possible identifiers include the called directory number, a name associated with the called directory number, or an identifier for a call appearance on the coverage set at which the call is alerting. For example, when a call is alerting at the third call appearance at a coverage terminal, a "3=" is displayed in the terminal display to identify the third call appearance. Each call appearance is assigned a particular directory number. By identifying a call appearance and thus identifying a particular directory number, the display information implicitly identifies a terminal that has that directory number as the terminal for which the call is intended. To provide further information for answering the call, the coverage set may also display an originating directory number for the call or a name associated with the originating directory number.

The alpha-numeric display also displays the second part of the two-part indicator defining the switch-hook status of the terminal defined by the first-part. Off-hook status is indicated by the presence of a character string in the display and on-hook status is indicated by the absence of a character string in the display. For example, in one illustrative embodiment, an asterisk is displayed in the display field to indicate off-hook status. The absence of an asterisk indicates on-hook status.

In an illustrative embodiment described herein, call coverage is provided using shared directory numbers. A coverage terminal and a terminal for which coverage is provided share a directory number. Calls to this directory number alert at both terminals. While the coverage terminal uses the two-part indicator to define the switch-hook status of the terminal for which coverage is provided, the coverage terminal alerts in response to the call to the shared directory number.

Such an arrangement is used to provide call coverage for calls to directory numbers shared by key-system groups of terminals. In response to an incoming call for a directory number shared by a key-system group, a lead terminal for the key system group is determined. The switch-hook status of the lead terminal is determined and transmitted to other terminals in the key-system group. The call is offered to the lead terminal and to the other group terminals. While alerting in response to the call, the other terminals each display an identifier for the call appearance at which the call is alerting and indicate the switch-hook status of the lead terminal.

In a second illustrative embodiment described herein, call coverage is provided using call forwarding. Calls to a terminal for which coverage is required are forwarded to a coverage terminal. An alpha-numeric display on the coverage terminal is used to identify the terminal for which a call is intended, for example, by displaying the called directory number or a name associated with the called directory number. The display is also used to define the switch-hook status of the identified terminal. One string of characters is displayed in the display if the switch-hook status of the identified terminal is off-hook and another string of characters is displayed if the switch-hook status is on-hook.

A user of a coverage terminal may request information to be displayed about a call at a particular call appearance. In response to such a request, the switching system determines updated switch-hook status for the lead terminal of the key-system group that shares the directory number for the call appearance. The switching system transmits the display information including the switch-hook status to the coverage terminal. The coverage terminal displays this information in the display.

A user of a coverage terminal may selectively examine display information for any number of calls at the coverage terminal by selecting different call appearances. When a new call appearance is selected the display information for that call appearance replaces the display information currently provided in the display. Updated switch-hook status is determined accordingly.

DRAWING DESCRIPTION

DETAILED DESCRIPTION

Figure 1:
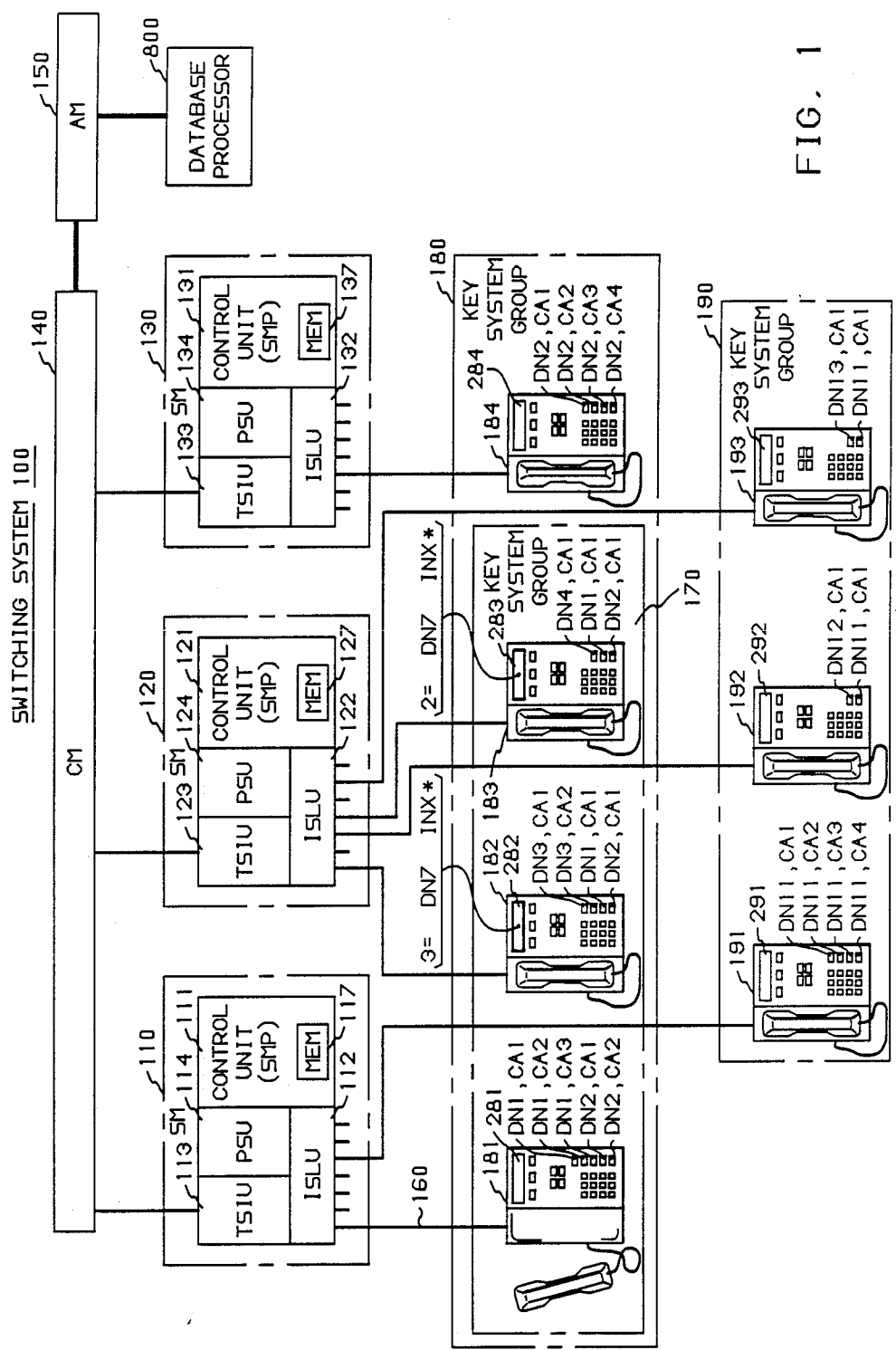
FIG. 1 is a diagram of a switching system serving a plurality of terminals.

The principles of the invention are described in the context of a distributed control, integrated services digital network (ISDN) switching system 100 (FIG. 1). An integrated services digital network is defined as a network evolved from the telephony integrated digital network that provides end-to-end digital connectivity to support a wide range of services, including voice and non-voice services, to which users have access by a limited set of standard multipurpose customer interfaces. System 100 is connectable to analog or digital terminals, however, only digital ISDN terminals 181 through 184 and 191 through 193 are shown in FIG. 1. (Although not shown in FIG. 1, system 100 is also connectable via trunks to terminals associated with other switching systems.) System 100 includes a number of switching modules (SMs) each associated with a different subset of terminals. For example, switching module 110 is associated with terminals 181 and 191, switching module 120 is associated with terminals 182, 183, 192, and 193, and switching module 130 is associated with terminal 184. Each switching module includes a control unit or switching module processor (SMP) for controlling connections to and from its associated subset of terminals. Switching module 110, for example, includes control unit 111. Similarly, switching modules 120 and 130 include control units 121 and 131, respectively.

Each ISDN user terminal communicates with system 100 in two 64 kilobits per second channels referred to as B-channels and in one 16 kilobits per second channel referred to as D-channel. In the present embodiment, one B-channel is used to convey digitized voice samples at the rate of 8000, eight-bit samples per second, and the other B-channel is used to convey data at a rate of 64 kilobits per second. (However, each B-channel could be used for either voice or data traffic). The D-channel is used both to convey signaling packets to effect message signaling between ISDN terminals and system 100 and to convey data packets between different ISDN terminals.

In the present exemplary embodiment, information is conveyed between an ISDN terminal and system 100 using a four-wire, digital subscriber line (DSL) 160 using one pair of wires for each direction of transmission. DSL 160 transmits a serial bit stream at the rate of 192 kilobits per second which comprises 144 kilobits per second for the above-mentioned two 64 kilobits per second B-channels and one 16 kilobits per second D-channel and which further comprises 48 kilobits per second used for a number of functions including framing, DC balancing, control and maintenance. DSL 160 represents what is referred to by the International Telegraph and Telephone Consultative Committee (CCITT) as the T-interface. The use of the T-interface is only exemplary, however, as the invention is equally applicable to systems using other access methods.

Signaling packets are conveyed between an ISDN terminal and system 100 enclosed in level 2 (link-level) frames in accordance, for example, with the standard LAPD protocol. The exemplary signaling messages used for the control of circuit switched voice calls are in accordance with CCITT recommendation Q.931.

The architecture of system 100 has a communications module (CM) 140 as a hub, with the switching modules 110, 120, and 130, and an administrative module (AM) 150 emanating therefrom. Each switching module includes an integrated services line unit (ISLU) which terminates the digital subscriber lines and provides access to a time-slot interchange unit (TSIU) and a packet switching unit (PSU). For example, in switching module 110, ISLU 112 terminates the digital subscriber lines, and TSIU 113 and PSU 114, respectively, provide circuit-switched and pack-switched connections to and from the associated terminal under the control of control unit 111. Switching modules 120 and 130 similarly include ISLUs 122 and 132, TSIUs 123 and 133, and PSUs 124 and 134.

Communications module 140 includes a time-shared, space-division switch or time-multiplexed switch, that provides 64 kilobits per second circuit-switched paths between switching modules. It supports B-channel traffic between switching modules, as well as packet traffic between PSUs in different switching modules. The switching module control unit provides call processing and overall control and maintenance functions for the switching module. Switching module control units in different switching modules communicate with each other and with the administrative module 150 through a message switch (not shown) in the communications module, using an internal message protocol. The architecture provides flexibility in placing specific process functions in specific processing elements. The general strategy is to place much of the required processing capability in the switching module control units, but to reserve the administrative module for those functions that are inherently centralized. The call processing functions can for example be distributed in a number of ways. In one alternative most of the call processing functions are placed in the switching module control units with routing, terminal hunting, and path hunt functions located in the administrative module. In another alternative, all call processing functions are placed in the switching module control units, with the administrative module reserved for truly administrative processing.

Figure 2:
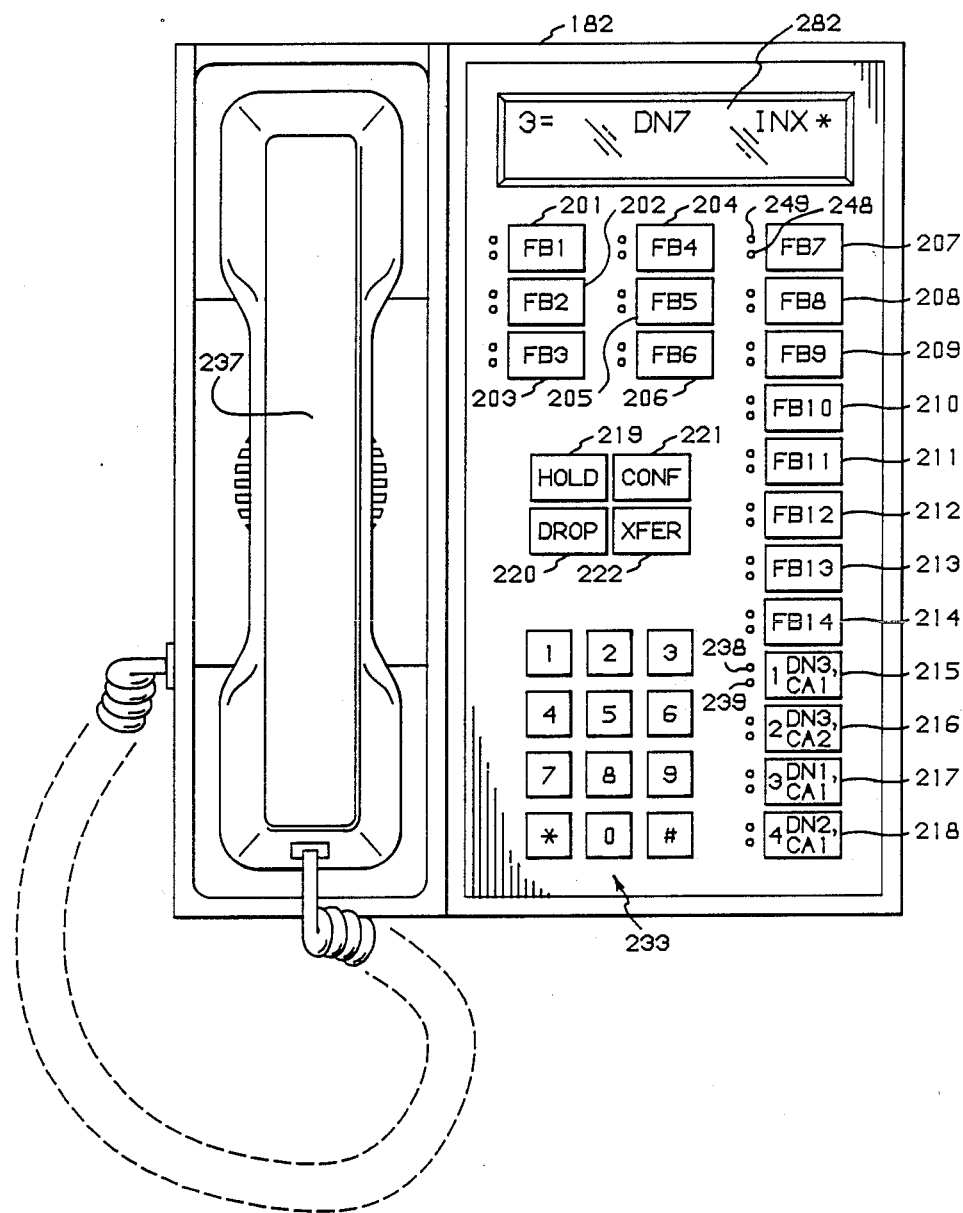
FIG. 2 is a more detailed diagram of a terminal of FIG. 1.

An exemplary ISDN terminal 182 is shown in FIG. 2. Terminal 182 includes a handset 237, a telephone keypad 233, and a display 282 for visually displaying messages. In the present example, display 282 contains a message relating to call alerting at terminal 182. Terminal 182 also includes 22 buttons 201 through 222. Buttons 219 through 222 are only used for the HOLD, DROP, CONFERENCE, and TRANSFER functions. The remaining buttons are configured at terminal 182 such that buttons 201 through 214 are feature buttons and buttons 215 through 218 are call appearances. However, the identical terminal could be configured to meet different user requirements, for example such that buttons 201 through 206 are call appearances and buttons 207 through 218 are feature buttons. Each call appearance or feature button has associated in-use and status lamps. For example, button 215 has associated in-use lamp 238 and status lamp 239. The in-use lamp is lit for a call appearance when that call appearance is the selected call appearance at the terminal. The status lamp is used to indicate the various stages of the call, alerting, active, etc., or to indicate the activation of feature buttons. The call appearances on the terminal are numbered from 1 to N, where N is the number of call appearances on the terminal. The number assigned to the call appearance is used to refer to the call appearance when displaying information in the terminal's display. In the present example, the "3=" displayed in the display indicates that the message provided in the display is related to the third call appearance on terminal 182.

The terminals shown in FIG. 1 comprises three key-system groups 170, 180, and 190. A key-system group is a set of terminals that share one or more call appearances for a single directory number (DN). Key-system groups may be grouped together into business customer groups. The dynamic busy/idle status information for a key-system group is stored by the control unit of the switching module connected to a lead terminal of the group. Each terminal has a primary directory number. If a group shared directory number is primary at any terminal, that terminal is selected as the lead terminal. The lead terminal has the maximum number of call appearances for the shared directory number. If the group shared directory number is not primary at any terminal, then the lead terminal is selected as follows. If one terminal of the group has more call appearances of the shared directory number than any of the other group terminals, the terminal having more call appearances is selected as lead terminal. If multiple terminals of the group each have the same maximum number of call appearances of the shared directory number, one of the multiple terminals is arbitrarily selected as the lead terminal. The control unit that stores the busy/idle status information for a key-system group is referred to herein as the lead control unit. The lead control unit is the control unit of the switching module connected to the lead terminal.

Key-system group 170 comprises terminals 181 through 183. Directory number DN1 is the shared directory number for group 170. Directory numbers DN1, DN3, and DN4 are the primary directory numbers for terminals 181, 182, and 183, respectively. Terminal 181 is the lead terminal for key-system group 170 and control unit 111 is the lead control unit. Terminal 181 has the maximum number of call appearances for directory number DN1, three. The dynamic busy/idle status information for the three call appearances of directory number DN1 is stored in memory 117 of lead control unit 111. Key-system group 180 comprises terminals 181 through 184. Directory number DN2 is the shared directory number for key-system group 180 and the primary directory number for terminal 184. Terminal 184 is the lead terminal for key-system group 180, and control unit 131 is the lead control unit. Terminal 184 has the maximum number of call appearances for directory number DN2, four. The dynamic busy/idle status information for the four call appearances of directory number DN2 is stored in memory 137 of lead control unit 131. Key-system group 190 comprises terminals 191 through 193. Directory number DN11 is the shared directory number for group 190. Directory numbers DN11, DN12, and DN13 are the primary directory numbers for terminals 191, 192, and 193, respectively. Terminal 191 is the lead terminal and control unit 111 is the lead control unit. Terminal 191 has the maximum number of call appearances for directory number DN11, four. The dynamic busy/idle status information for the four call appearances of directory number DN11 is stored in memory 117 of lead control unit 111.

The processing of calls to and from terminals of key-system groups is performed cooperatively by the control units associated with those terminals. The overall processing task is broken down into a number of major tasks called program processes. A process comprises a collection of procedures, each performing some subtask of the process. Associated with a process is a block of memory called a process control block which stores data applicable to the entire process. Processes communicate with each other via messages. The same type of message is used in communicating with another process in the same processor, or another process in a different processor. In system 100, processes are of two types: terminal processes and system processes. System processes remain in existence as long as the system is operational. Terminal processes on the other hand remain in existence only for the duration of individual calls or service events such as diagnostic tests or service evaluation. For each call, system 100 creates a terminating terminal process to control the terminating end of the call and an originating terminal process to control the originating end of the call.

Figure 3:
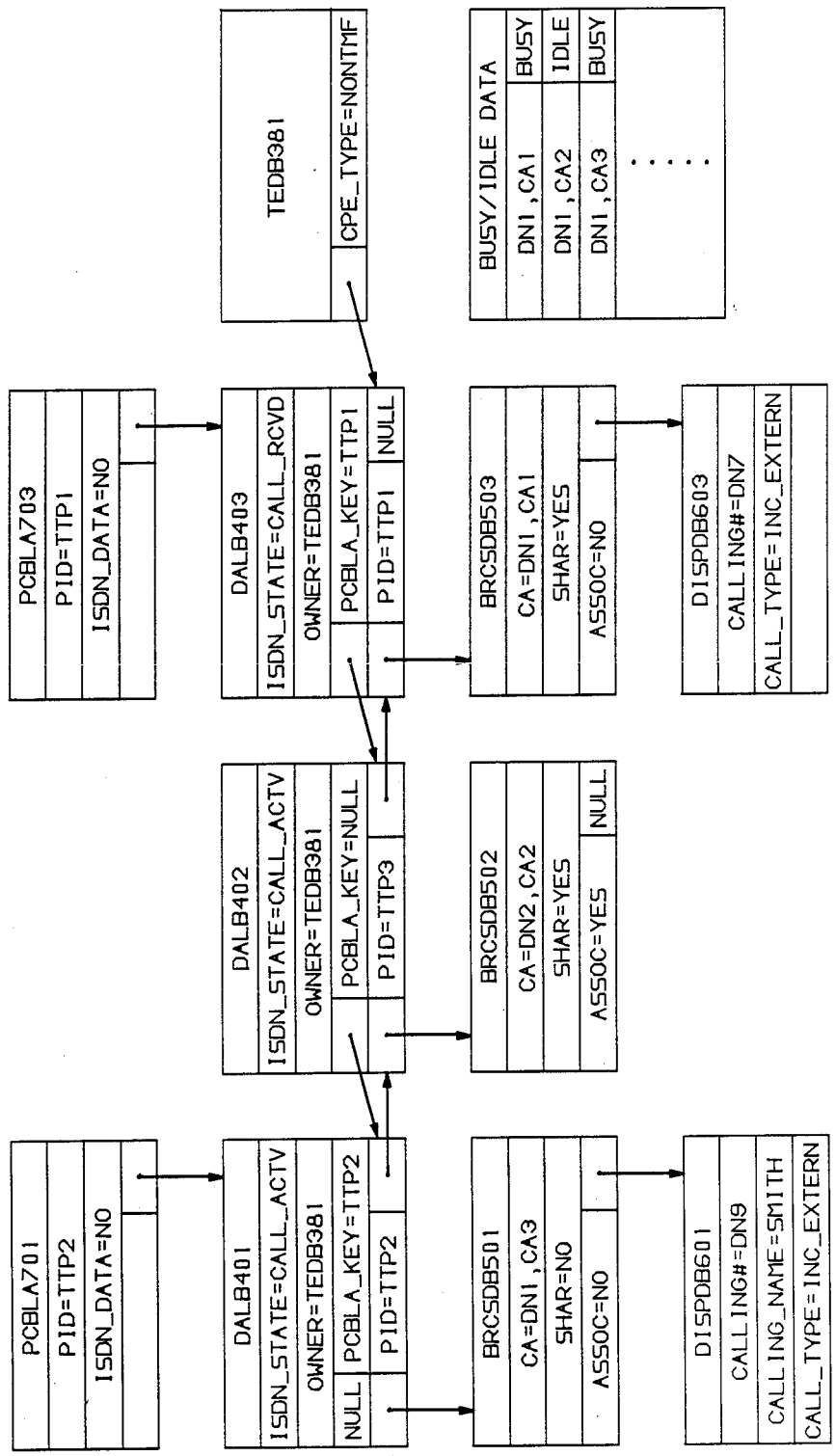
FIG. 3 shows call related data stored in a control unit of the switching system of FIG. 1 defining call activity at a terminal of FIG. 1.

For each terminal connected to switch 100, switch 100 stores a terminal equipment data block (TEDB) in the memory of the control unit to which the terminal is connected. FIG. 3 shows the terminal equipment data block, TEDB381, for terminal 181. Block TEDB381 is stored in memory 117 of control unit 111. Linked to block TEDB381 are data blocks, referred to as D-Channel application linkage blocks (DALBs). There is one D-Channel application linkage block for each call for which status is displayed at terminal 181. Each D-Channel application linkage block is related to a particular call and exists only for the duration of that call. The D-Channel application linkage blocks for each terminal are doubly linked to each other to allow the list of blocks for a particular terminal to be traversed and searched. The links are illustrated in FIG. 3 by arrows linking block DALB401, block DALB402, and block DALB403. The links are implemented in memory 117 by storing in the link field of each D-Channel application linkage block the address of the block to which it is linked. If no block is linked, the null value is stored in the link field. The same link arrangement is used between other blocks as indicated in FIG. 3. Each D-Channel application linkage block has an owner field which identifies the terminal equipment data block that owns the D-Channel application linkage block. Terminal equipment data TEDB381 owns three D-Channel application blocks, DALB401, DALB402, and DALB403 (FIG. 3).

Linked to each D-Channel application linage block is a business, residence custom services data block (BRCSDB) that stores further information about the call at a particular call appearance. Again, this block is associated with a particular call and exists only for the duration of the call. The business, residence custom services data block identifies the call appearance and defines whether the call appearance is shared with other terminals and whether it is an associated call appearance. Since call appearances may be shared by several terminals, one of the shared call appearances is identified as the primary call appearance for a particular call that is related to the call appearance. The other call appearances are referred to as associated call appearances for that particular call. The primary call appearance is the call appearance at the terminal at which the call is being handled or is expected to be handled. The associated call appearances track the status of the call at the primary call appearance.

If the call appearance at a terminal is primary for a particular call rather than merely associated, a display data block (DISPDB) is linked to the business, residence custom services data block. The display data block contains display information including calling or called party information related to the call. The display data block exists only for the duration of the call to which it is related. In addition, if a call appearance at a terminal is primary for a particular call, a process controlling the call is associated with the terminal. This process, which may be an originating terminal process or a terminating terminal process, has a process control block (PCBLA) that links to the D-Channel application linkage block allocated for the call. For example, terminal 181 is active on an incoming call at call appearance CA3 of directory number DN1. Call appearance CA3 at terminal 181 is primary for the call. Thus, a terminating terminal process, TTP2, controls one end of that call and is related to terminal 181. In addition, a display data block, DISPDB601, is linked to block BRCSDB501. In this particular example, block DISPD601 contains the calling directory number and the calling party's name. Process TTP2 also has a process control block, PCBLA701, in which process TTP2 stores data about the call.

System 100 enables terminals connected to the system to cover calls for other terminals. Two call coverage methods are described herein: (1) a shared call appearance method, and (2) a call forwarding method. In accordance with the first method, call coverage may be provided by sharing call appearances between the coverage sets and the sets for which coverage is provided. Calls to a shared call appearance alert at both the coverage and the covered station set. For example, terminal 182 covers calls for terminal 181 and terminal 184 through the use of shared call appearances (FIG. 1) Terminals 182 and 183 share call appearance CA1 for directory number DN1 with terminal 181 and share call appearance CA1 for directory number DN2 with terminal 184. Calls to call appearance CA1 of directory number DN1 can be answered at terminal 181, terminal 182, or terminal 183. In accordance with the second call coverage method, system 100 provides call coverage using call forwarding. Call forwarding is enabled for a terminal so that when a call is not answered within a prespecified amount of time or when there are no idle call appearances for the called directory number, the call is forwarded to a coverage set. Calls may also be forwarded on user request.

When offering a call intended for a covered terminal to a coverage terminal, system 100 informs the coverage terminal of the switch-hook status of the covered terminal. The switch-hook status information assists call coverage personnel in handling calls. If the terminal for which a call has been received at the coverage set is indicated to be off-hook, coverage personnel will know that the called party is busy on another call. The coverage terminal indicates the switch-hook status of the covered terminal by using the terminal display as a two-part indicator. The first part identifies the terminal for which status is displayed and the second part defines the switch-hook status of the terminal identified by the first part of the identifier. For example, FIG. 1 shows the information provided in displays 282 and 283 at terminals 182 and 183, respectively, in response to an incoming call to directory number DN1. The "3=" in display 282 indicates that the display information corresponds to a call at the third call appearance of terminal 182. The third call appearance is assigned directory number DN1. Thus, the user of terminal 182 recognizes that the incoming call is intended for the terminal that has directory number DN1 as a primary directory number. In this example, terminal 181, the lead terminal for key system group 170, has directory number DN1 as a primary directory number. The "DN7"]in display 282 identifies directory number DN7 as the originating directory number for the call. The "INX" in display 282 is abbreviation discussed in more detail below that identifies the call as an incoming call. The "*" in display 282 indicates that the terminal for which the called directory number is primary, in this example terminal 181, is off-hook. The presence of the asterisk indicates an off-hook condition while the absence of an asterisk indicates an on-hook condition. In other arrangements consistent with the invention, switch-hook status could be indicated in other ways. For example, a character string, such as the "INX" in display 202, could blink to indicate an off-hook condition.

The following description is arranged in two parts. First, the procedure for determining the switch-hook status of a terminal is discussed. For both call coverage methods, the same procedure is used to determine the switch-hook status of the covered terminal. Then the application to the procedure to provide a switch-hook status indication in both the shared call appearance and call forwarding methods for call coverage is discussed.

Figure 4:
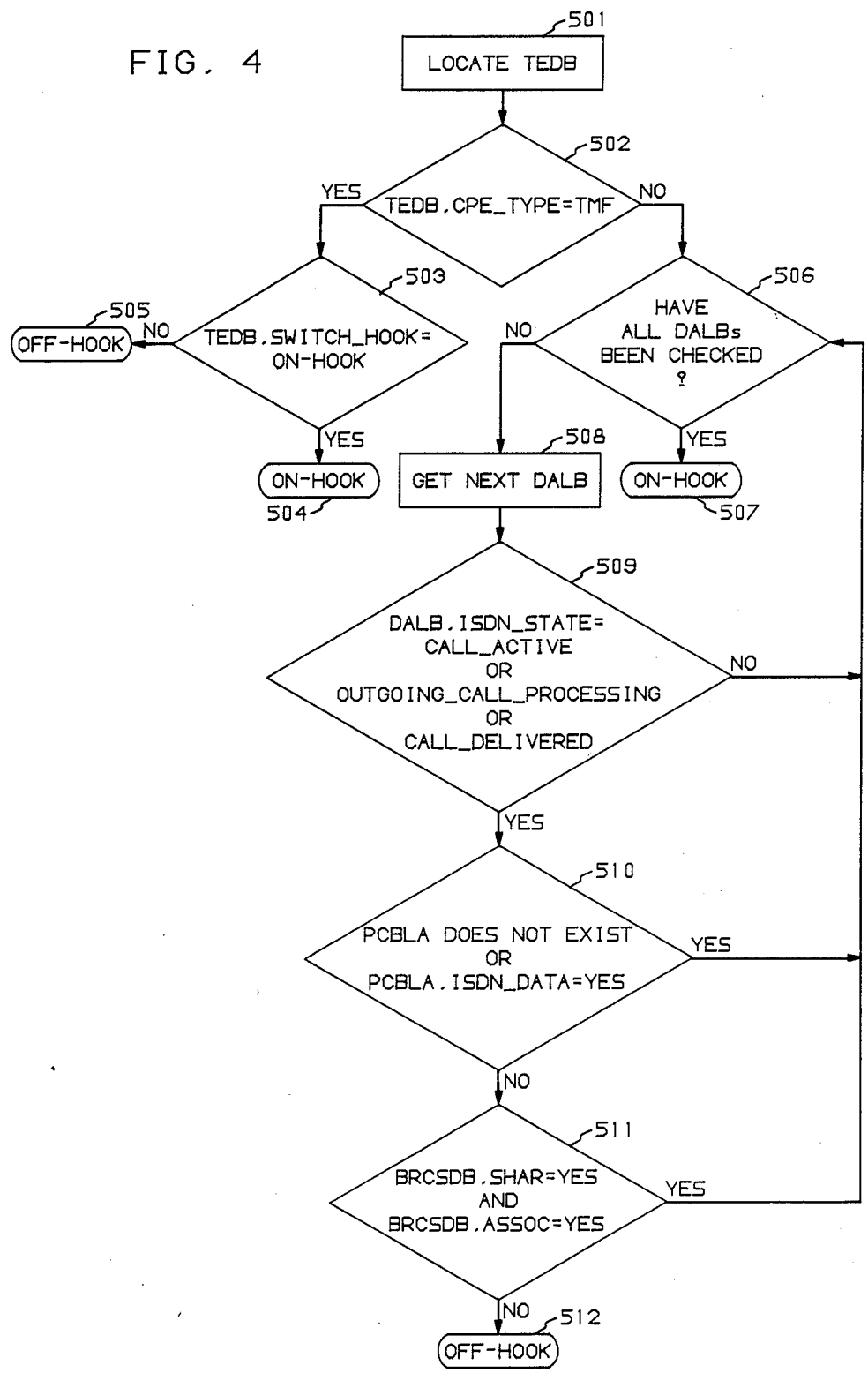
FIG. 4 is a flowchart for determining the switch-hook status of a terminal of FIG. 1.

A flow chart for a call processing program used to determine the switch-hook status is shown in FIG. 4. The process executing this call processing program is associated with a process control block for a call that is related to the terminal for which status has been requested. Execution begins with block 501 in which the location of the terminal equipment data block corresponding to the terminal is determined. The process executing the program locates the terminal equipment data block by following the link from the process control block to a D-Channel application linkage block containing information for the call. The owner field of the D-Channel application linkage block defines the terminal equipment data block for the terminal. Execution proceeds to block 502 where the terminal type of the terminal is determined. The terminal type of a terminal is defined by a cpe_type field in the terminal equipment data block. The terminal type is either terminal management (TMF) or non-terminal management (nonTMF). For a terminal management terminal, system 100 manages the status of the buttons on the terminal and determines the selected call appearance for the terminal. Non-terminal management terminals perform these functions for themselves. The message signaling between terminal management terminals and a switching system is described in U.S. Pat. No. 4,741,026 issued to L. A. Baxter, et al. To perform the additional functions required for a terminal management terminal, system 100 maintains additional data about the status of the terminal. Thus, the data available to determine whether a given terminal is off-hook differs depending on whether the terminal is a terminal management terminal.

If the cpe_type field in the terminal equipment data block indicates that the terminal is a terminal management terminal, execution proceeds with block 503. The switch-hook status of the terminal is determined by reading the switch_hook attribute in the terminal equipment data block. The switch_hook attribute indicates whether the terminal is on-hook or off-hook and execution ends at block 504 or block 505. Processing is completed at this point for terminal management terminals.

If the check of the cpe_type field made in block 502 indicates that the terminal is a non-terminal management terminal, execution proceeds with block 506. Each of the D-Channel application blocks are checked until all the blocks have been checked or a block corresponding to a call for which the terminal is considered off-hook is found. The search through the D-Channel application blocks begins with the block directly linked to the terminal equipment data block and continues through the list of blocks. If block 506 is executed and all the D-Channel application blocks in the list have been checked, execution proceeds to block 507 and the terminal is determined to be on-hook. Otherwise, whenever block 506 is executed and there are still D-Channel application linkage blocks remaining to be searched, execution begins with block 509 where the isdn—state field in the D-Channel application linkage block is checked to determine if a call is active at some occurrence of the call appearance. An isdn—state of call—active, outgoing—call—proceeding, or call delivered indicates that a call is active at some occurrence of the call appearance but not necessarily at this terminal. The states indicate that one terminal sharing the call appearance is off-hook on an incoming or outgoing call or attempting an outgoing call. If the isdn—state field does not contain one of these specified values, execution proceeds to block 506 where the process will be repeated for the next D-Channel application linkage block in the list.

If the isdn—state field contains one of the specified values, execution proceeds to block 510 where if a process control block exists, an isdn—data field in the process control block is checked to determine if the related call is a data call. Whether a process control block exists is determined from the pcbla—key field in the D-Channel application linkage block. If the pcbla—key field is set to "NULL," no process control block exists and processing continues with block 506 where the process will be repeated for the next D-Channel application block in the list. Otherwise, the pcbla—key field identifies the block. The terminal is defined as off-hook only for voice calls. Thus, if a process control block exists and the isdn—data field is set to "YES" indicating that the call is a data call, execution proceeds to block 506 where the process will be repeated for the next D-Channel application block in the list.

Otherwise, execution proceeds to block 511 where the shared and associated fields in the business, residence custom services data block are examined to determine whether the call is active at this terminal or at another terminal. If the shared field is set to "YES," the call appearance is shared. If the associated field is set to "YES," the call is just being tracked at this terminal. If the shared and associated fields are both set to "YES," the call is active at another terminal, so execution proceeds to block 506 where the process will be repeated for the next D-Channel application block in the list. Otherwise, execution proceeds to block 512 and the switch-hook status is determined as off-hook. If all the blocks are searched without finding a call appearance that is off-hook, the terminal is defined as on-hook.

The following discussion explains how process TTP1, a terminating terminal process that is controlling one side of an incoming call at call appearance CA1 of directory number DN1, uses the data discussed above and the call processing program defined by the flow chart in FIG. 4 to determine the switch-hook status of terminal 181. First, process TTP1 follows the link from its process control block, PCBLA703, to block DALB403 (FIG. 3). By examining the owner field of block DALB403, process TTP1 determines that block TEDB381 contains the terminal equipment data for terminal 181. Process TTP1 reads the cpe—type field of block TEDB381 to determine whether terminal 181 is a terminal management terminal or a non-terminal management terminal. For the present example, the cpe—type field in block TEDB381 defines terminal 181 as a non-terminal management terminal. Thus, process TTP1 begins to search through the D-Channel application linkage blocks owned by block TEDB381 for any block corresponding to a call at terminal 181 for which terminal 181 would be considered off-hook. Process TTP1 first examines block DALB403. The isdn—state of block DALB403 is call—received so process TTP1 moves to the next D-Channel application linkage block, DALB402. The isdn—state of block DALB402 is call—active so process TTP1 locates the process control block associated with the call to examine the isdn—data field. The pcbla—key field of DALB402 is set to "NULL" indicating that no process control block exists. Process TTP1 continues on to the next D-Channel application linkage block, DALB401. The isdn—state of block DALB401 is call—active. Process TTP1 locates the process control block associated with the call to examine the isdn—data field. The pcbla—key field of DALB402 is set to TTP2 so process TTP1 examines the isdn—data field for the process control block whose key, process identifier (pid), is set to TTP2. The isdn—data field is set to "NO," so process TTP1 checks the shared and associated fields in the business, residence custom services data block linked to block DALB401, block BRCSDB501. If both the shared and associated fields in block BRCSDB502 are set to "YES," the call appearance is only tracking a call that is primary at another occurrence of the shared call appearance. In the present example, the shared and associated fields of block BRCSDB501 are both set to "NO," so process TTP1 determines that terminal 181 is off-hook.

Figure 5:
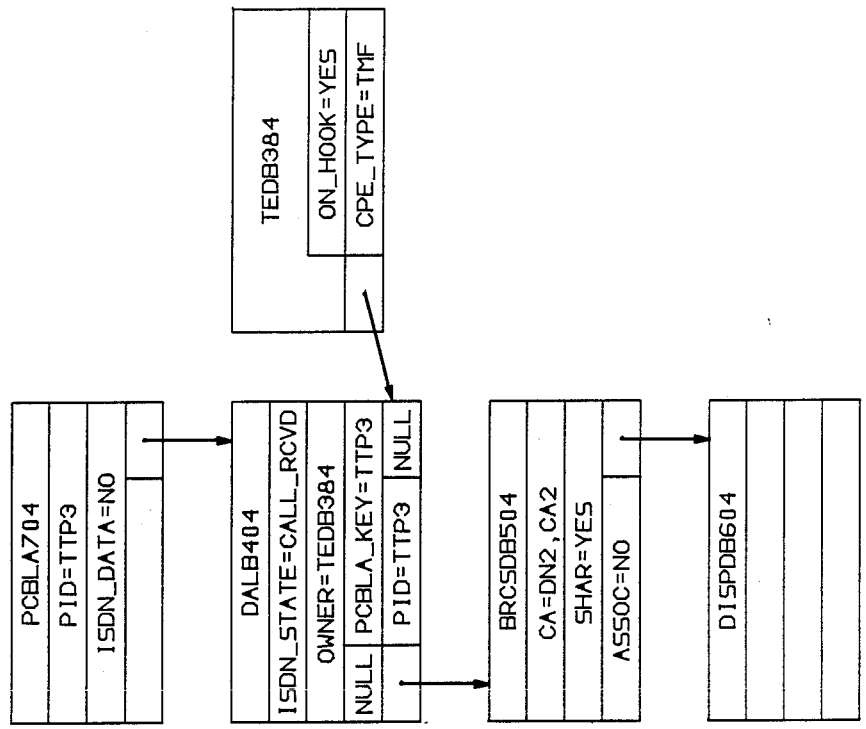
FIG. 5 shows call related data stored in a control unit of the switching system of FIG. 1 defining the call activity at a terminal of FIG. 1.

The following describes how process TTP3, a terminating terminal process for an incoming call at call appearance CA2 of directory number DN2 of terminal 184, determines the switch-hook status for terminal 184. FIG. 5 shows the block TEDB384 and associated data stored in memory 137 of control unit 131 for terminal 184, a terminal management terminal. As described above for process TTP1 and terminal 181, process TTP3 finds the terminal equipment data block associated with terminal 184, block TEDB384. Proces TTP3 reads the cpe—type field in block TEDB384. Since the cpe—type of terminal 184 is terminal management, process TTP3 determines the switch-hook status of terminal 184 by reading the switch—hook attribute in block TEDB384. In the present example the switch—hook attribute indicates that terminal 184 is on-hook.

Figure 6:
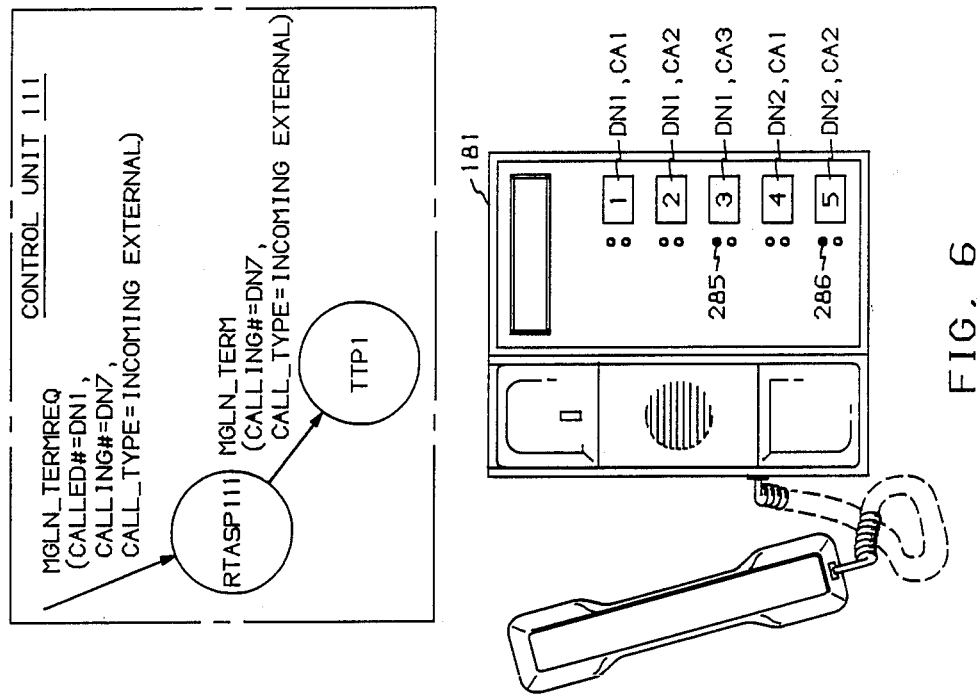
FIGS. 6 and 7 are functional diagrams showing the transfer and use of display information by the switching system and terminals of FIG. 1 when call coverage is provided using shared call appearances.

The display capabilities for call coverage terminals in a key-system group are now described with reference to an exemplary incoming call to directory number DN1. A translation of the called directory number DN1 results in a determination of the system 100 port connected to terminal 181 since terminal 181 is the lead terminal for key-system group 170 (FIG. 1) having shared directory number DN1. As a result of the translation, a MGLN—TERMREQ message (FIG. 6) is received by a routing and terminal allocation (RTA) system process RTASP111. Process RTASP111 reads busy/idle data in memory 117 to determine if an idle call appearance is available for directory number DN1. Assume that call appearance CA1 of DN1 is available. Assume also that terminal 181 is active on call appearance CA3 of directory number DN1 and call appearance CA2 of directory number DN2 is active at terminal 184. Lamps 285 and 286 indicate that active calls are associated with these call appearances. The status of these two call appearances is defined by block DALB401 and block DALB402 (FIG. 3). Process RTASP111 changes the status of call appearance CA1 from idle to busy in the busy/idle data in memory 117 and creates terminating terminal process TTP1 (FIG. 6). In addition, process RTASP111 allocates data blocks DALB403 and BRCSDB503 (FIG. 3).

RTASP111 sends an MGLN_TERM message to proces TTP1. The MGLN_TERM message contains information about the call, including the calling number and a call type field, e.g., outgoing call external, outgoing call internal, incoming call external, incoming call internal. Outgoing call external indicates that the call is an outgoing call to a terminal outside the business customer group. Outgoing call internal indicates that the call is an outgoing call to a terminal within the business customer group. Incoming call external indicates that the call is an incoming call from a terminal outside the business customer group. Incoming call internal indicates that the call is an incoming call from a terminal within the busines customer group. In the present example, the call type is incoming call external. Process TTP1 allocates block DISPDB603 and stores the calling number and the call type in block DISPDB603. FIG. 3 shows the busy/idle call appearance data, terminal equipment data block, D-channel application linkage blocks, business, residence custom services data blocks, and display data blocks related to terminal 181 and stored in memory 117.

Two features provided by system 100 are the calling name and called name display features. These features provide for displaying in a terminal's display a name corresponding to the calling directory number or called directory number. These features may be selected on a per terminal basis. Process TTP1 determines if a name display feature is activated for terminal 181. If a name display feature is activated, proces TTP1 sends a message containing the calling and/or called directory number to an attached database processor 800 (FIG. 1) to retrieve the name corresponding to the directory number. In FIG. 1, database processor 800 is shown connected to administrative module 150. Alternatively, database processor 800 could be connected to any of the switching modules, 110, 120, or 130. The name database could also be stored in switching system 100 rather than in an attached processor. Process TTP1 does not wait for a response from database processor 800. Instead, process TTP1 sets a timer, NAMETIMER, and continues processing the call. In the present example, the NAMETIMER timer is a five second timer.

Figure 7:
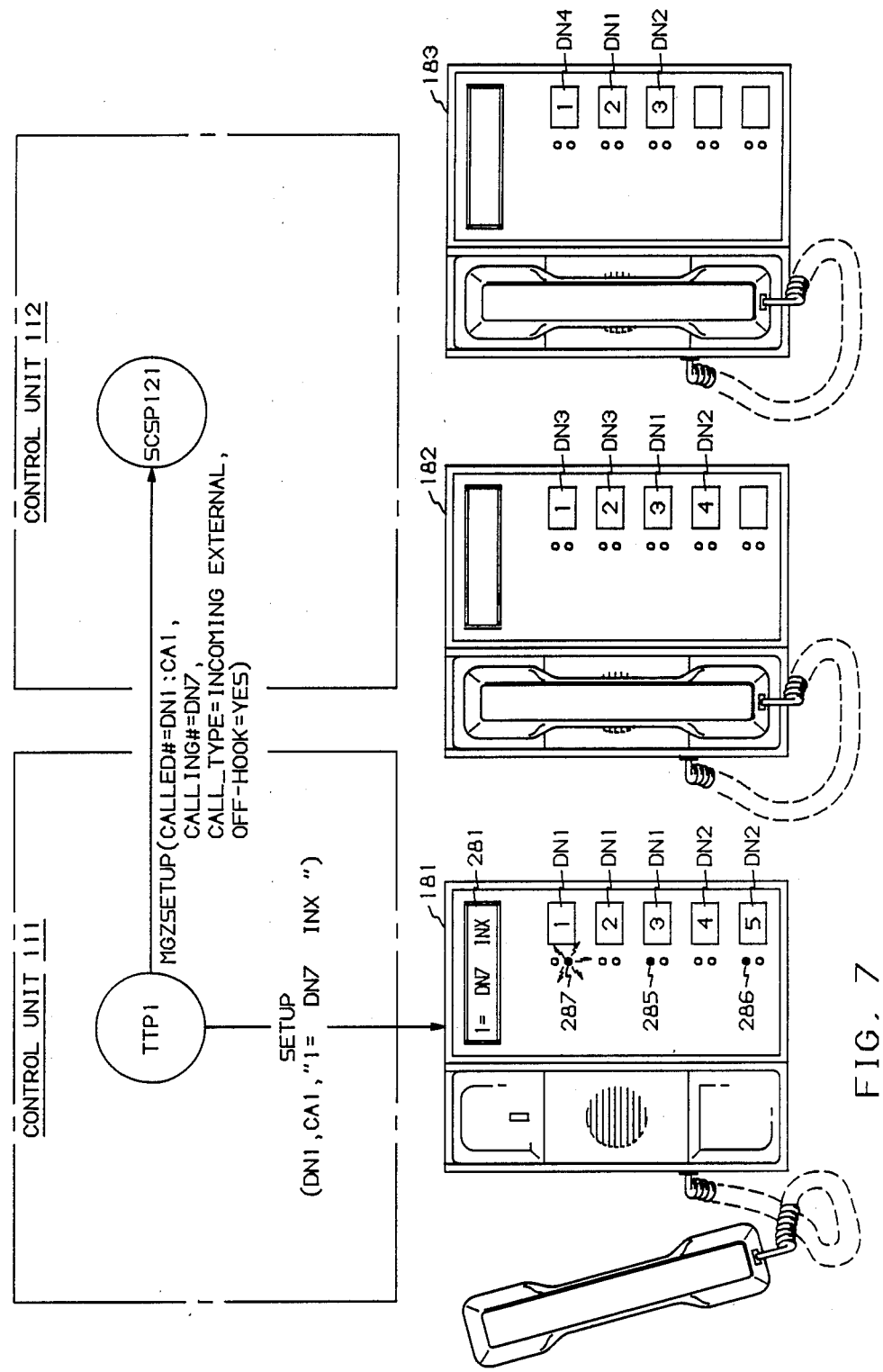

In the present example, the name display feature is not activated. After setting the timer, process TTP1 prepares a SETUP message to send to terminal 181. Process TTP1 formats the data stored in block DISPDB603 into an ASCII test string in the following way. The call type field is translated into a three character ISDN Call Identification (ICI) code. The ISDN call identification code is used as a shorthand method of informing the terminal user of the type of call. Possible ICI code values include but are not limited to the following: OuX (Outgoing call eXternal), OuI (Outgoing call Internal), InX (Incoming call eXternal), and InI (Incoming call Internal). The calling number stored in block DISPDB603 is translated into ASCII. The call appearance at which the call is offered is also indicated in the ASCII string. In this example, the "1=" at the beginning of the ASCII string indicates that the display information corresponds to a call at the first call appearance, call appearance CA1 for directory number DN1. Process TTP1 includes the ASCII string of display data in the SETUP message and sends the SETUP message to terminal 181. In response to the SETUP message containing the display data, terminal alerts, returns CALL_PROC or ALERTING messages to process TTP1. While alerting in response to the SETUP message, terminal 181 displays the text string from the SETUP message in display 281 (FIG. 7).

If the call appearance is shared, SETUP messages are sent to the associated terminals. In the present example, since the call appearance is shared (the shared field in block BRCSDB503 is set to "YES"), SETUP messages are sent to the associated terminals 182 and 183. Each control unit with terminals belonging to key-system groups has a single shared call system process (SCSP) used to coordinate the communications with all such terminals. Process TTP1 transmits the MGZSETUP message to shared call system process SCSP121, the shared system process in control unit 121 for associated terminals 181 and 182 of key-system group 170.

Figure 8:
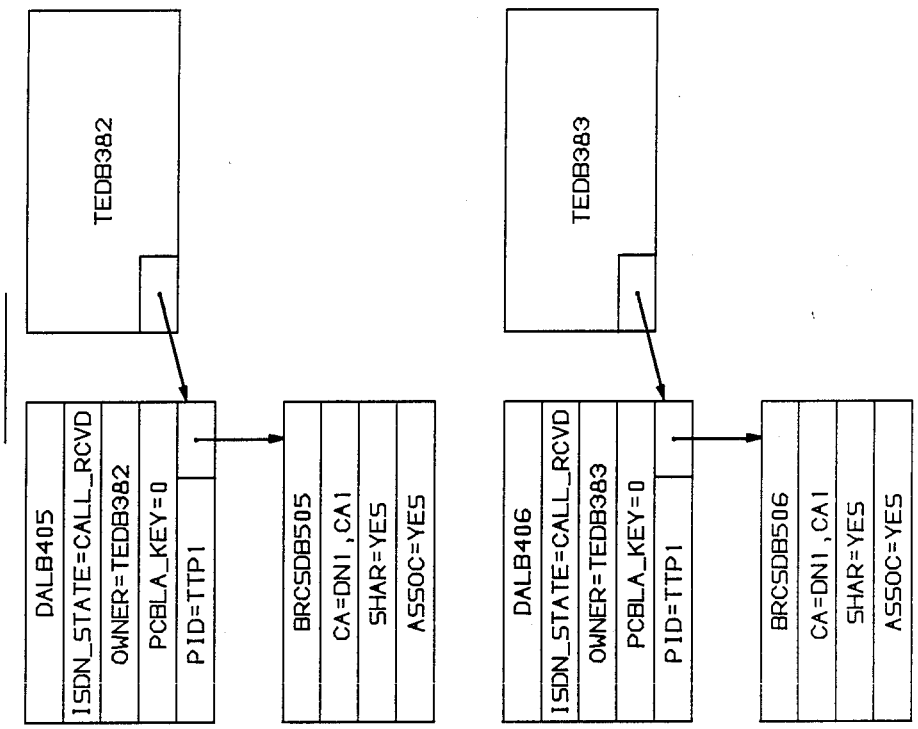
FIG. 8 shows call related data stored in a control unit of the switching system in FIG. 1 in response to the call processing actions illustrated by FIGS. 6 and 7.
Figure 9:
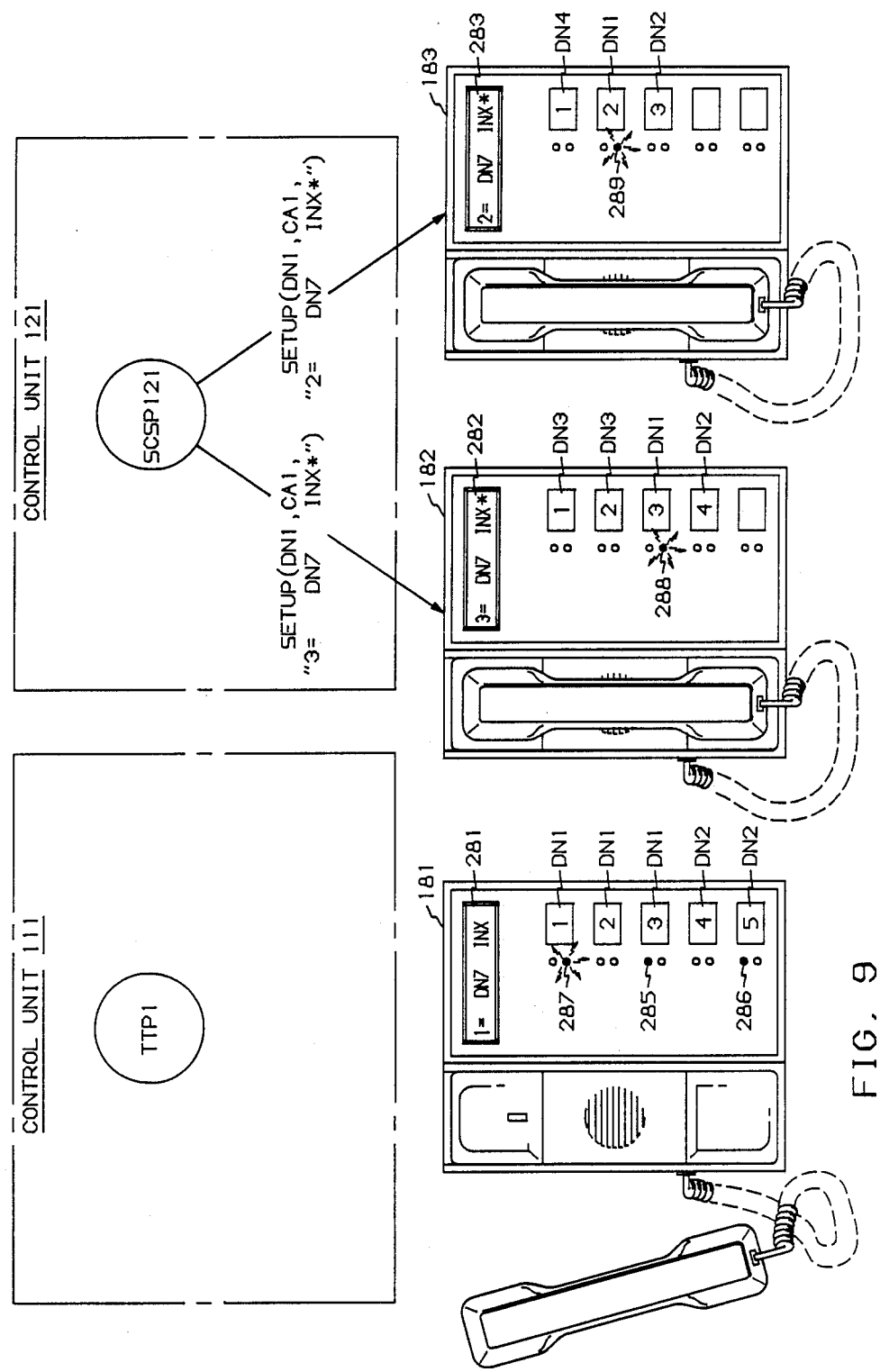
FIG. 9 is a functional diagram showing the final steps in the transfer and use of display information for a call, the initial steps of which are illustrated by FIGS. 6 and 7.

Process TTP1 includes display data in the MGZSETUP message. Process TTP1 formats the display data as follows. Process TTP1 copies the data from block DISPDB603 into the MGZSETUP message. Process TTP1 performs the switch-hook status determination procedure for a non-terminal management terminal discussed above to determine whether terminal 181 is off-hook. Process TTP1 determines that terminal 181 is off-hook so process TTP1 sets the off-hook field in the MGZSETUP message to "YES." In FIG. 7, the MGZSETUP message transmitted to process SCSP121 is shown. In response to the MGZSETUP message, process SCSP121 allocates, links, and initializes blocks DALB405, BRCSDB505, DALB406, and BRCSDB506 (FIG. 8) for the associated terminals 182 and 183. Process SCSP121 formats the display data in the MGZSETUP message into an ASCH text string, including translating the call type field into an ICI code. If the off-hook field is set to "YES," an asterisk is appended to the ICI code in the ASCII text string. Otherwise, no character is appended to the ICI code. The presence of an asterisk indicates to the user of the associated terminal that the lead terminal for the directory number is off-hook. Absence of an asterisk indicates that the lead terminal for the directory number is on-hook. In the present example, an asterisk is appended to the ICI code (InX*) since the off-hook field is set to "YES." Process SCSP121 transmits SETUP messages to terminals 182 and 183 (FIG. 9). Process SCSP121 sends the formatted ASCII test string to terminal 182 and 183 in the SETUP messages (FIG. 9). In response to the SETUP message, terminals 182 and 183 begin alerting. In response to the display data in the SETUP message, terminals 182 and 183 display in display 282 and 283 the ASCII text string passed in the SETUP message (FIG. 9). FIG. 9 shows the terminal displays 281, 282, and 283 for terminals 181, 182, and 183, respectively. Displays 282 and 283 include the ICI code, InX*, with an asterisk appended to indicate that terminal 181 is off-hook.

The terminal user recognize that the display provides information about the incoming call that is currently at the terminal. The display indicates the call appearance to which the display information corresponds. For example, in FIG. 9, the "3=" in display 282 indicates that the display information corresponds to the third call appearance button, call appearance CA1 for directory number DN1, and the "2=" in display 283 indicates that the display information corresponds to the second call appearance button, call appearance CA1 for directory number DN1. This allows the user to determine which call is being referenced if more than one call is alerting at the terminal. The same display on a coverage set advantageously may be used to indicate switch-hook status for several terminals. Additional information that may be included in the display, such as calling party or called party information, further helps the coverage set user to relate the display information to a particular call.

System 100 also allows a terminal user to inspect the status of a call at a call appearance. For example, assume that another call begins alerting at call appearance CA1 of directory number DN2 at terminal 182. The display at terminal 182 now displays information for the newly alerting call. The user at terminal 182 wants to pick up the call that is still alerting at call appearance CA1 of directory number DN1. However, first, the user wants to determine who the caller is and whether terminal 181 is still off-hook with a call on another call appearance.

Figure 10:
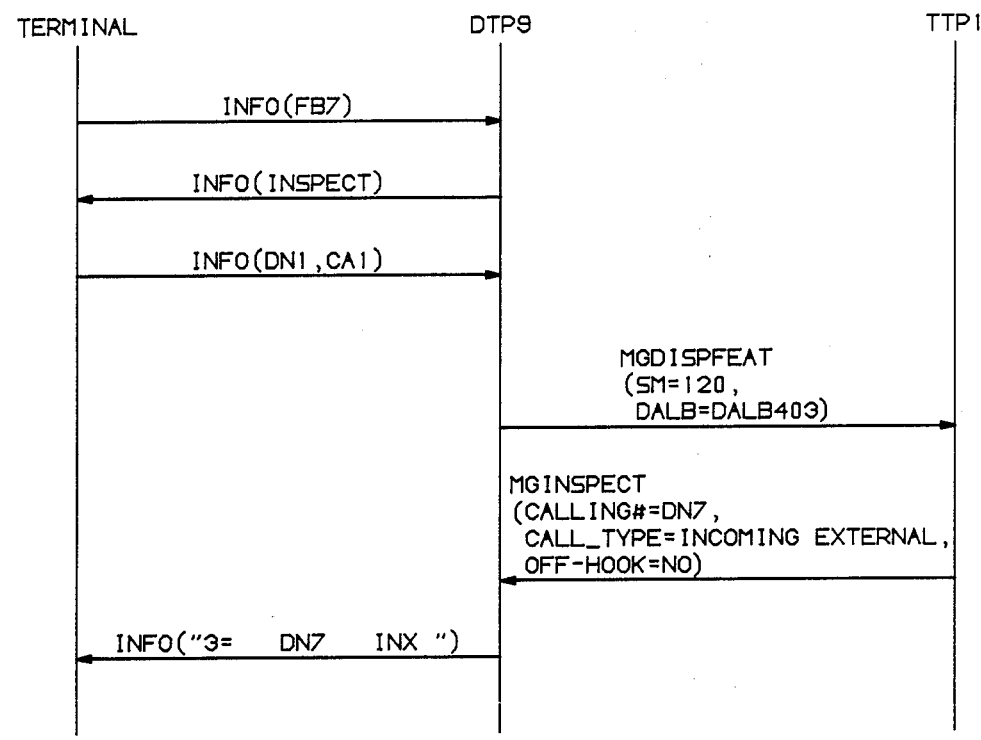
FIG. 10 is a message sequence diagram for inspecting a call appearance on a terminal of FIG. 1.

To inspect call appearance CA1 of directory number DN1, the user at terminal 182 depresses feature button 207 on terminal 182. In this particular example, this feature button corresponds to the inspect feature. In response, terminal 182 sends an INFO message to switch 100 indicating that the inspect button has been depressed (FIG. 10). This message is forwarded to the display terminal process for terminal 182. If no display terminal process currently exists for terminal 182, a display terminal process is created and the INFO message is passed to that process. In the present example, process DTP9 is created. Process DTP9 sends an INFO message to terminal 182 (FIG. 10). In respone to this INFO message, the display mode of terminal 182 is changed to the inspect display mode. To indicate the changed display mode, lamp 248 representing the normal display mode is turned off and the lamp 249 indicating the inspect display mode is turned on. Next, the user of terminal 182 depresses button 217 corresponding to call appearance CA1 of directory number DN1. Terminal 182 sends an INFO message to process DTP9 defining the call appearance that has been depressed (FIG. 10). Depending on the type of terminal, terminal management or non-terminal management, process DTP9 locks through the D-Channel application linkage blocks for a matching call reference value or through the business, residence custom services data block for a matching call appearance. Once process DTP9 determines the corresponding D-Channel application linkage block, process DTP9 formats a MGDISPFEAT message. Process DTP9 includes in the MGDISPFEAT message an identificaton of the D-Channel application linkage block. Process DTP9 also includes its own process identification and switching module identification in the MGDISPFEAT message. Process DTP9 sends the MGDISPFEAT message to the terminal process identified by the process identifier (pid) field in the D-Channel application linkage block, in this case, process TTP1 (FIG. 10). In resposne to the MGDISPFEAT message from process DTP9, process TTP1 traverses the links from its process control block PCBLA703 through D-Channel application linkage block DALB403 and business, residence custom services data block BRCSDB503 to display data block, DISPDB603 (FIG. 3). Process TTP1 copies display data, including the calling number and call type, from block DISPDB603 into an MGINSPECT message.

Since the switch-hook status indicator is not displayed on the display of the lead terminal, process TTP1 first checks whether the lead terminal is making this request. If the switching module from which the MGDISPFEAT message was sent identifies the switching module in which process TTP1 is executing and if the D-Channel application linkage block identified in the MGDISPFEAT message identifies the D-Channel application linkage block linked to process control block PCBLA703 for process TTP1, the lead terminal is requesting the display data. If the lead terminal is requesting the display information, a determination of the lead terminal switch-hook status is not required.

Figure 11:
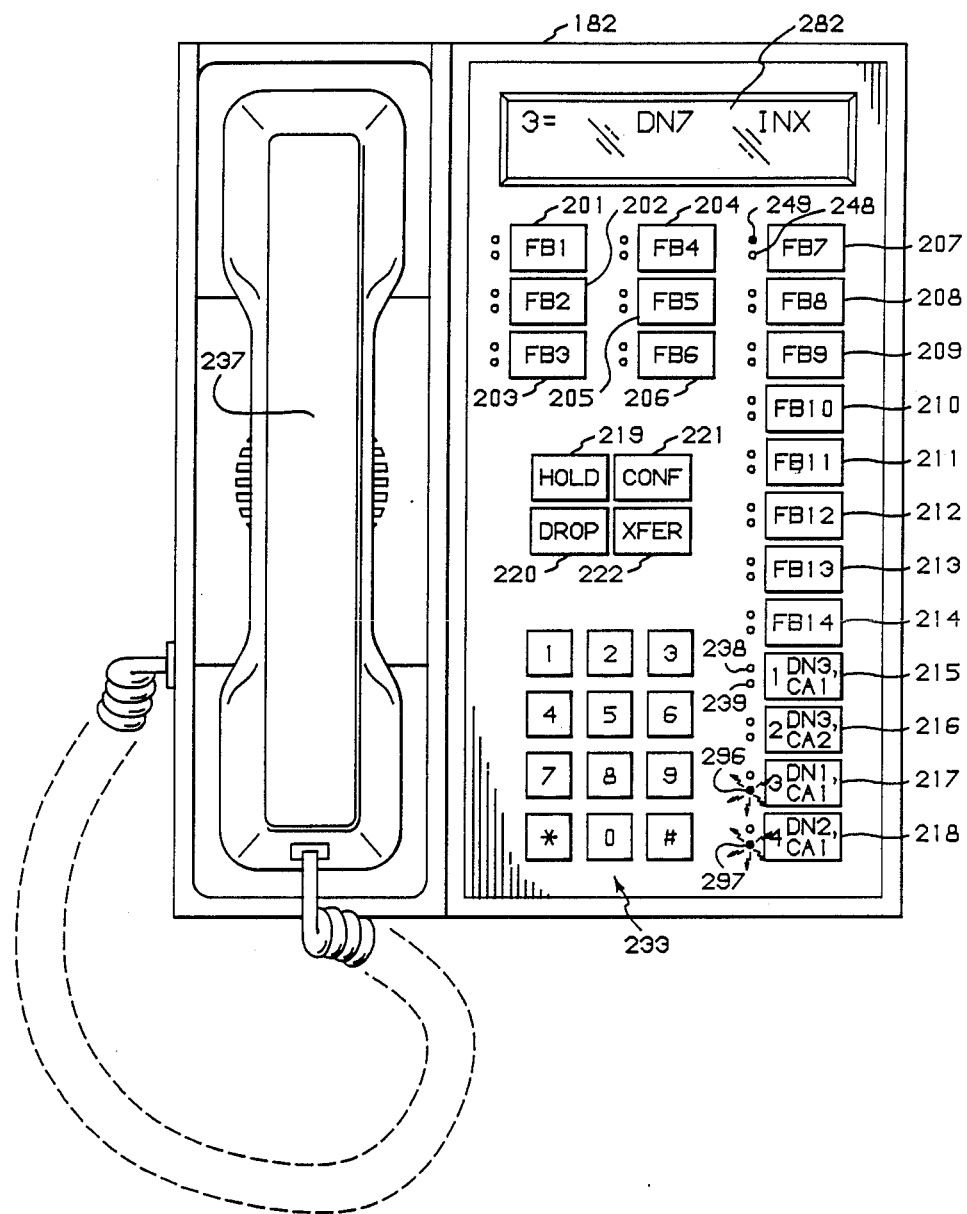
FIG. 11 shows the terminal display that results when a terminal of FIG. 1 carries out the procedure of FIG. 10.

If, as in the present example, a terminal other than the lead terminal is requesting the display information, process TTP1 performs the switch-hook determination procedure for a non-terminal management terminal discussed above to determine whether terminal 181 is off-hook. Assume that terminal 181 just went on-hook and is no longer active on call appearance CA3 of directory number DN1. Since terminal 181 is now on-hook with no call appearances active, process TTP1 determines that terminal 181 is not off-hook and sets the off-hook field in the MGINSPECT message to "NO." Process TTP1 sends the MGINSPECT message to process DTP9 (FIG. 10). On receipt of the message, process DTP9 performs the procedure of formatting the display information received in the message into an ASCII text string as discussed above. This includes formatting the call type into an ICI code and determining whether an asterisk should be appended to the ICI code based on the value of the off-hook field. Process DTP9 sends an INFO message containing the text string to terminal 182 (FIG. 10). Terminal 182 receives the INFO message from process DTP9 and displays the test string in display 282. Since terminal 181 is no longer off-hook, an asterisk is not appended to the ICI code. FIG. 11 shows display 232 at terminal 182 with the new information displayed.

Other actions than an inspect request may require the display data for a call appearance to be redisplayed. For example, when a terminal exits from the inspect mode or at other times when the current display terminates, the terminal will display information about the selected call appearance if there is call activity at the call appearance. New display information is also provided when a call is retrieved from hold or when a key-system terminal bridges onto an existing call. Display information is provided when an alerting call for which data was not currently being displayed is answered. The display information is also refreshed by a refresh routine that runs every 5 to 15 minutes. In these cases the display information is obtained and formatted into an ASCII text string including an ICI code with an asterisk possibly appended to the ICI code.

Figure 12:
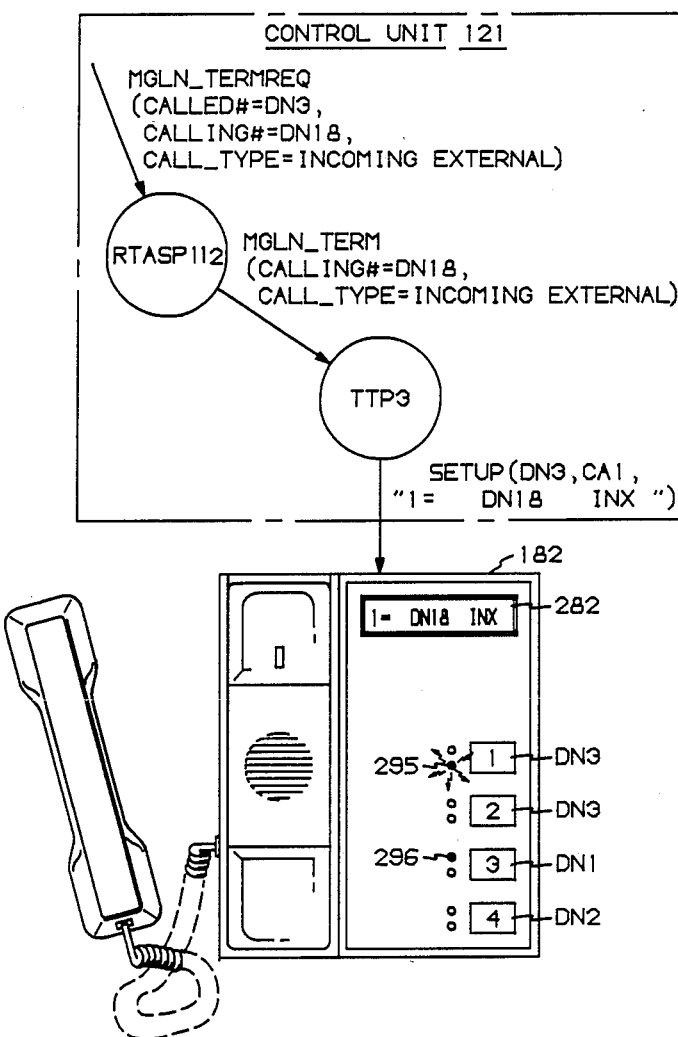
FIGS. 12 through 14 are functional diagrams showing the transfer and use of display information by the switching system and terminals of FIG. 1 when call coverage is provided using call forwarding.

The display capabilities for call coverage terminals in an arrangement in which call coverage is provided through the use of call forwarding are now described with reference to an exemplary incoming call to directory number DN3. Terminal 182, the terminal for which directory number DN3 is a primary directory number, has activated the Call Forwarding No Answer feature. This feature forwards calls that are not answered within a prespecified amount of time. In the present example the amount of time in which the call must be answered is 7 seconds. A translation of called directory number DN3 results in a determination of the system 100 port connected to terminal 182 since directory number DN3 is the primary directory number for terminal 182. As a result of the translation, a MGLN_TERMREQ message (FIG. 12) is received by a routing and terminal allocation (RTA) system process RTASP112. Process RTASP112 reads busy/idle data in memory 127 (FIG. 1) to determine if an idle call appearance is available. Assume that call appearance CA1 is available. Assume also that terminal 182 is active on a call at call appearance CA1 for directoy number DN1. RTASP112 determines that the call forwarding no answer feature is activated for terminal 182. RTASP112 creates a terminating terminal process TTP3 and sends an MGLN_TERM message (FIG. 12) to process TTP3. The MGLN_TERM message contains the calling number and a indication that call forwarding no answer is activated for terminal 182. Process TTP3 sends a SETUP message (FIG. 12) to terminal 182 to offer the incoming call to the terminal. Process TTP3 sets a timer, T1, for 7 seconds.

Figure 13:
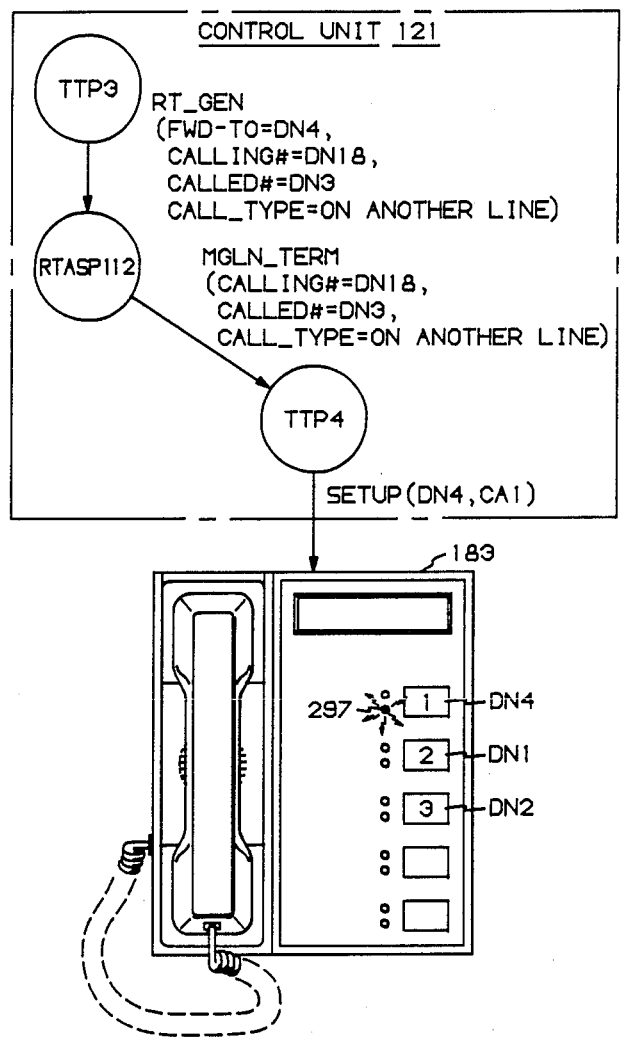

Assume, for example, that timer T1 expires before terminal 182 has accepted the call. In response to the expiration of timer T1, process TTP3 begins to format a RT_GEN message to use in forwarding the call. The call is to be forwarded to directory number DN4. Process TTP3 places the directory number to which the call is to be forwarded, the calling number, and called number in the RT_GEN message. Process TTP3 performs the switch—hook determination procedure for a non-terminal management terminal discussed above to determine if terminal 182 is off-hook. Process TTP3 determines that terminal 182 is off-hook so process TTP3 includes in the RT_GEN message a call type no_answer_off-hook indicating that the call was forwarded because the call was not answered at the called terminal and that the called terminal was off-hook on another call appearance. If process TTP3 had determined that the terminal was on-hook, process TTP3 would have included a call type of no_answer_on-hook indicating that the call was forwarded because there was no answer at the called terminal. The RT_GEN message (FIG. 13) is sent to a routing and terminal allocation system process RTASP112. A translation of the forward-to directory number DN4 results in a determination of the system 110 port connected to terminal 183 since directory number DN4 is the primary directory number for terminal 183. Process RTASP112 reads busy/idle data in memory 127 to determine if an idle call appearance is available for directory number DN4. Assume that call appearance CA1 is available. Process RTASP112 changes the status of call appearance CA1 from idle to busy in the busy/idle data in memory 127 and creates terminating terminal process TTP4. In addition, process RTASP112 allocates and initializes data blocks DALB407 and BRCSDB507. Process RTASP112 sends an MGLN_TERM message (FIG. 13) to process TTP4. The MGLN_TERM message contains information about the call, including the calling directory number, the directory number from which the call was forwarded (called number), and the call type. Process TTP4 allocates a display data block DISPDB607 and stores the calling number, directory number DN18; the called number, directory number DN3; and call type information in block DISPDB607.

Process TTP4 determines if the calling name display feature or the called name display feature is activated for terminal 183. For forwarded calls the called name display feature displays the name associated with the directory number from which the call was forwarded. In this particular example, both the calling name and called name display features are activated for forwarded calls to terminal 183. Process TTP4 sends a message containing the calling and called (forwarded-from) directory number to an attached database processor 800 (FIG. 1). Process TTP4 does not wait for a response from database processor 800. Instead, process TTP4 sets a five second timer, NAMETIMER, and continues processing the call.

Next, process TTP4 sends a SETUP message (FIG. 13) to terminal 183. Terminal 183 responds to the SETUP message by alerting and returning CALL_PROC or ALERTING messages to process TTP1.

Figure 14:
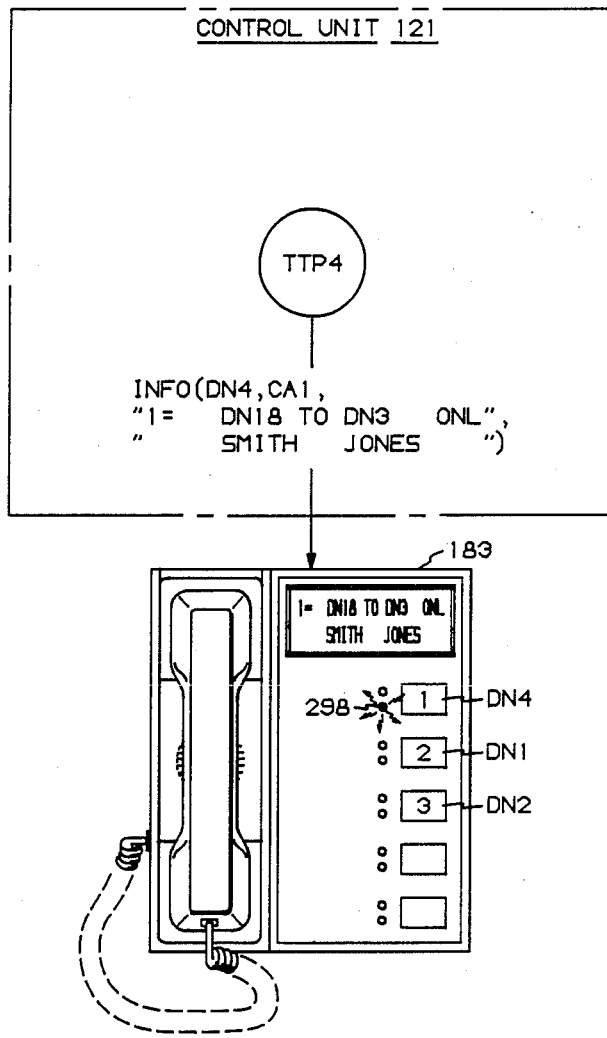

When either timer NAMETIMER expires or the calling and called name information is received from database processor 800, process TTP4 begins to format an INFO message to send to terminal 183. If the calling and called name information has been received, process TTP4 stores the calling and called name in DISPDB607. Process TTP4 formats the display information from DISPDB607, including the name information if it has been obtained, into an ASCII string. If the call type in the display data block is no_answer_off-hook, indicating that the call was forwarded because the call was not answered and the terminal was off-hook, an ICI code of "OnL", an abbreviation for on-line, is included in the text string. If the call type in the display data block is no_answer_on-hook, indicating that the call was forwarded because the call was not answered and the terminal was on-hook, an ICI code of "CFN", an abbreviation for call forwarding no-answer, is included in the text string. In the present example, the call type in DISPDB607 is no_answer_off-hook so an ICI code of "OnL" is included in the test string. Process TTP4 sends an INFO message (FIG. 14) to terminal 183 and includes the text string for the display information in the INFO message. If neither the calling name nor the called name feature were active, process TTP4 would have included this display information in the SETUP message. Terminal 183 displays the text string in display 283 while alerting in response to the call. Based on the ICI code, coverage personnel can determine whether the called party is busy on another call.

Figure 15:
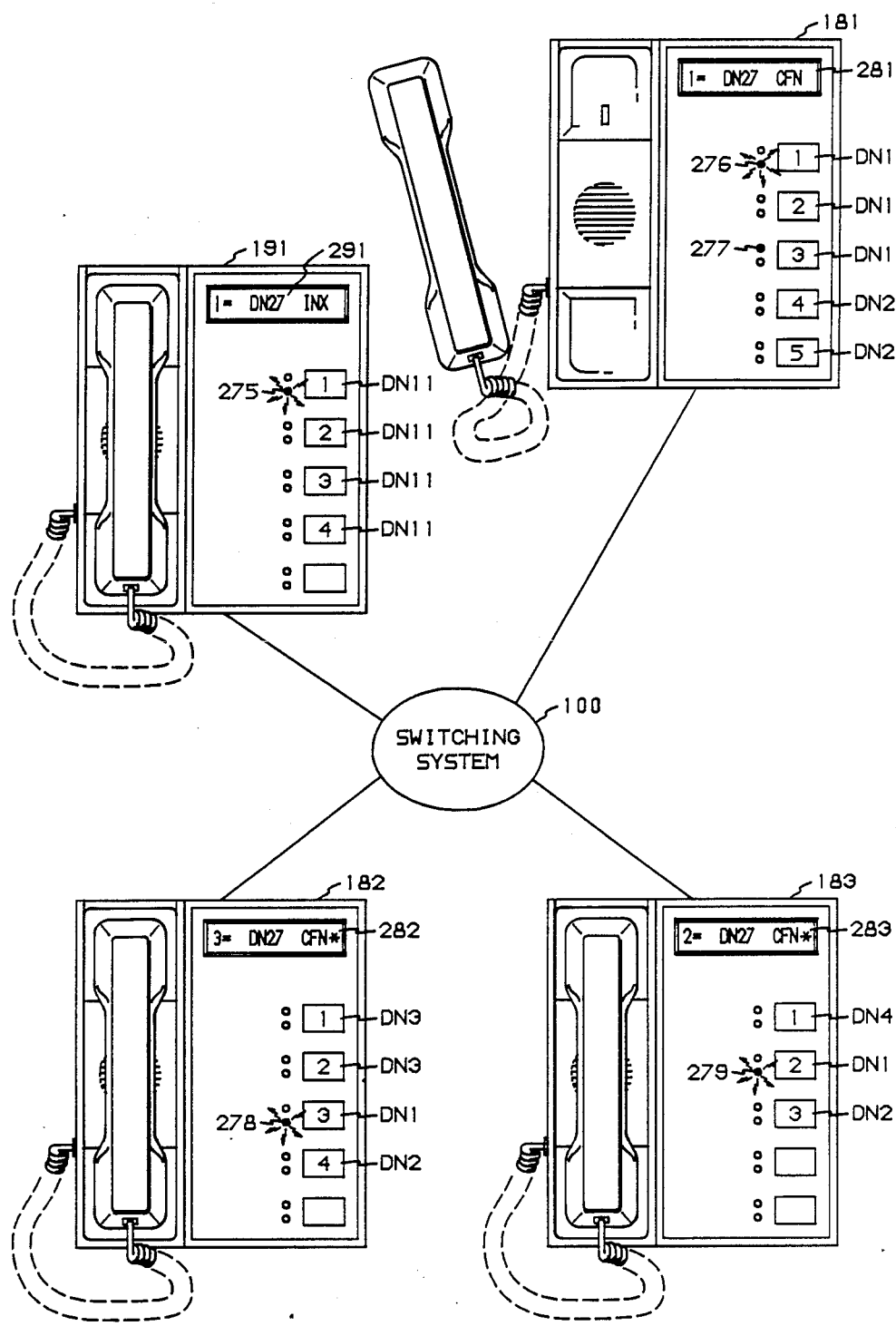
FIG. 15 shows the terminal display resulting from shared call appearances and call forwarding being used together to provide call coverage by the switching system and terminals of FIG. 1.

The call forwarding and shared call appearance call coverage methods may be used in combination. For example, if a call to directory number DN11 was forwarded to call appearance CA1 of directoy number DN1, the terminals that share call appearance CA1 of directory number DN1 would also display information about the forwarded call. The ICI code will always indicate the original or first reason for forwarding. For example, if a call to directory number DN11 from directory number DN27 is forwarded to call appearance CA1 of directoy number DN1 because terminal 191 did not answer the call and terminal 191 is on-hook, the ICI code, CFN, will be displayed at terminal 181 and the other terminals in key-system group 170 sharing call appearance CA1 of directory number DNI. If terminal 181 is off-hook when the forwarded call arrives, an asterisk will be appended to the ICI code in the displays on terminals 182 and 183. FIG. 15 shows displays 291, 281, 282, and 283 of terminals 191, 181, 182, and 183 for this scenario. The following table shows the interactions between the status of the forwarding and forwarded-to sets and the resulting ICI when a call is forwarded using the Call Forwarding Don't Answer feature.

| Status of Forwarding | Status of Forwarded-to | ICI Display on Forwarded-to | ICI Display on Shared DN of Forwarded-to |
| --- | --- | --- | --- |
| Idle | Idle | CFN | CFN |
| Idle | Active | CFN | CFN* |
| Active | Idle | OnL | OnL |

-continued

| Status of Forwarding | Status of Forwarded-to | ICI Display on Forwarded-to | ICI Display on Shared DN of Forwarded-to |
|---|---|---|---|
| Active | Active | OnL | OnL* |

*Applies only to non-lead port displays of a key system group

It is to be understood that the above-described call forwarding arrangements are merely illustrative of the principles of the present invention and that many variations may be devised by those skilled in the art without departing from the spirit and scope of the invention. It is therefore intended that such variations be included within the scope of the claims.

We claim:

1. In an arrangement comprising a switching system interconnecting a plurality of terminals, a method for providing call coverage for calls to a directory number shared by a first one of said terminals and a second one of said terminals, said first terminal including a two-part indicator comprising a first part for identifying any one of said terminals and a second part for defining switch-hook status of at most one of said terminals said first terminal also including a first plurality of call appearances with at least one of said first plurality of call appearances assigned said directory number, said second terminal including a second plurality of call appearances, said method comprising in response to an incoming call for said directory number, determining switch-hook status of said second terminal, transmitting said determined switch-hook status to said first terminal, in response to receipt of said determined switch-hook status, said first terminal using said two-part indicator to provide an indication for use in answering said call at said first terminal such that said first part identifies said second terminal and said second part defines said determined switch-hook status of said second terminal as identified by said first part, and while performing said step of using said two-part indicator, alerting at said at least one cell appearance at said first terminal in response to said call for said directory number.

2. A method in accordance with claim 1 wherein said first terminal further includes an alpha-numeric display to display call information, said display comprises said first part of said two-part indicator, and each of said first plurality of call appearances at said first terminal is assigned a unique identifier, wherein said step of using said two-part indicator comprises displaying the unique identifier for said at least one call appearance at said first terminal in said display for use in identifying said call as being intended for said second terminal and using said second part to define said determined switch-hook status of said second terminal.

3. A method in accordance with claim 2 further comprising said switching system obtaining an originating directory number for said incoming call, transmitting said originating directory number to said first terminal, and while performing said step of using said two-part indicator, displaying said originating directory number in said display.

4. A method in accordance with claim 3, wherein said switching system stores name data associating a name with each of a plurality of directory numbers including said originating directory number, said method further comprising reading said name data to determine the name associated with said originating directory number, transmitting said determined name to said first terminal, and while performing said step of using said two-part indicator, displaying said determined name in said display.

5. A method in accordance with claim 4, wherein said display also comprises said second part of said two-part indicator, wherein said step of using said second part further comprises indicating in said display said determined switch-hook status such that one of off-hook and on-hook is indicated by the presence of a character string in said display and the other of off-hook and on-hook is indicated by the absence of said character string in said display.

6. A method in accordance with claim 4, wherein said display also comprises said second part of said two-part indicator, wherein said step of using said second part further comprises indicating in said display said determined switch-hook status such that an off-hook condition is indicated by displaying one string of characters in said display and an on-hook condition is indicated by displaying another string of characters in said display.

7. A method in accordance with claim 1 further comprising said first terminal transmitting answer signaling for said call, after transmitting said answer signaling, said first terminal receiving a message containing updated switch-hook status for said second terminal, and in response to receipt of said message containing said updated switch-hook status, said first terminal using said two-part indicator to indicate said updated status such that said first part identifies said second terminal and said second part defines said updated switch-hook status of said second terminal as identified by said first part.

8. A method in accordance with claim 7, said method further comprising said first terminal transmitting answer signaling for said cell, after transmitting said answer signaling, said first terminal transmitting a request to said switching system for information about said call, in response to said request, said switching system determining updated switch-hook status for said second terminal, after determining said updated switch-hook status, said switching system transmitting said updated switch-hook status to said first terminal, in response to receipt of said updated switch-hook status, said first terminal using said two-part indicator to indicate said updated status such that said first part identifies said second terminal and said second part defines said updated switch-hook status of said second terminal as identified by said first part.

9. A method in accordance with claim 1 further comprising
said first terminal discontinuing use of said two-part indicator in providing said indication for use in answering said call at said first terminal,
after said discontinuing step, determining updated switch-hook status of said secon terminal and transmitting said updated switch-hook status to said first terminal,
in response to receipt of said updated switch-hook status, said first terminal using said two-part indicator to indicate said updated status such that said first part identifies said second terminal and said second part defines said updated switch-hook status of said second terminal as identified by said first part.

10. A method in accordance with claim 1 further comprising
in response to receipt of a new call at said first terminal, said first terminal discontinuing use of said two-part indicator in providing said indication for use in answering said incoming call at said first terminal and using said two-part indicator to provide an indication for use in answering said new call at said first terminal,
in response to a request from said first terminal to return to said incoming call, determining updated switch-hook status of said second terminal and transmitting said updated switch-hook status to said first terminal,
in response to receipt of said updated switch-hook status, said first terminal using said two-part indicator to indicate said updated status such that said first part identifies said second terminal and said second part identifies said updated switch-hook status of said second terminal identified by said first part.

11. A method in accordance with claim 1 further comprising
said first terminal transmitting answer signaling for said call,
after transmitting said answer signaling, said first terminal transmitting hold signaling to place said call on hold,
after transmitting said hold signaling, said first terminal discontinuing use of said two-part indicator in providing said indication for use in answering said call at said first terminal,
in response to a request from said first terminal requesting retrieval of said call from hold, determining updated switch-hook status of said second terminal and transmitting said updated switch-hook status to said first terminal,
in response to receipt of said updated switch-hook status, said first terminal using said two-part indicator to indicate said updated status such that said first part identifies said second terminal and said second part defines said updated switch-hook status of said second terminal as identified by said first part.

12. A method in accordance with claim 1, wherein said switching system stores call appearance data for said second terminal defining call status at said second plurality of call appearances, wherein said step of determining said second terminal switch-hook status comprises
reading said call appearance data for said second terminal,
determining said second terminal switch-hook status as on-hook when said read call appearance data defines none of said second plurality of call appearances as having a call status corresponding to an off-hook condition, and
determining said second terminal switch-hook status as off-hook when said read call appearance data defines at least one of said second plurality of call appearances as having a call status corresponding to an off-hook condition.

13. A method in accordance with claim 1, wherein said switching system stores switch-hook data defining the switch-hook status of said second terminal, wherein said step of determining switch-hook status of said second terminal comprises
reading said switch-hook data,
determining said second terminal switch-hook status as off-hook when said read switch-hook data defines said switch-hook status as off-hook, and
determining said second terminal switch-hook status as on-hook when said read switch-hook data defines said switch-hook status as on-hook.

14. A method in accordance with claim 1 wherein said first terminal further includes an alpha-numeric display to display call information, wherein said display comprises said first part of said two-part indicator, said method further comprising
transmitting to said first terminal said directory number, and
wherein said step of using said two-part indicator comprises displaying said directory number in said display to identify said call as being intended for said second terminal and using said second part to define said determined switch-hook status of said second terminal.

15. A method in accordance with claim 1 wherein said first terminal further includes an alpha-numeric display to display call information, said method further comprising
said switching system obtaining an originating directory number for said incoming call,
transmitting said originating directory number to said first terminal, and
while performing said step of using said two-part indicator, displaying said originating directory number in said display.

16. A method in accordance with claim 1 wherein said first terminal further includes an alpha-numeric display to display call information, said display comprises said first part of said two-part indicator, and said switching system stores name data associating a name with each of a plurality of directory numbers including said directory number of said second terminal, said method further comprising
in response to said incoming call, reading said name data to determine the name associated with said directory number of said second terminal,
transmitting said determined name to said first terminal, and
wherein said step of using said two-part indicator comprises, in response to receipt of said determined name, displaying said determined name in said display to identify said call as intended for said second terminal and using said second part to define said determined switch-hook status of said second terminal.

17. A method in accordance with claim 1 wherein said first terminal further includes an alpha-numeric display to display call information, and said switching system stores name data associating a name with each of a plurlity of directory numbers, said method further comprising obtaining an originating directory number for said incoming call, wherein said originating directory number is one of said plurality of directory numbers, in response to said incoming call, reading said name data to determine the name associated with said originating directory number, transmitting said determined name to said first terminal, and while performing said step of using said two-part indicator, displaying said determined name in said display.

18. A method in accordance with claim 1 wherein said first terminal includes another plurality of call appearances and shares said directory number with said second terminal, said first terminal further includes an alpha-numeric display to display call information, said display comprises said second part of said two-part indicator, and said step of using said two-part indicator comprises using said first part to identify said second terminal, and indicating in said display said determined switch-hook status of said second terminal as identified by said first part.

19. A method in accordance with claim 18, wherein said step of indicating said determined switch-hook status further comprises indicating an off-hook condition by displaying one string of characters in said display, and indicating an on-hook condition by displaying another string of characters in said display.

20. A method in accordance with claim 18 wherein said step of indicating said determined switch-hook status further comprises indicating one of off-hook and on-hook by the presence of a character string in said display, and indicating the other of off-hook and on-hook by the absence of said character string in said display.

21. A method in accordance with claim 20 wherein said character string is an asterisk.

22. A method in accordance with claim 1 wherein said step of using said two-part indicator comprises using said first part to identify said second terminal, and using said second part to define said determined switch-hook status such that one of off-hook and on-hook is indicated by a blinking indication at said first terminal and the other of off-hook and on-hook is indicated by the absence of a blinking indication at said first terminal.

23. A call coverage method for use by an arrangement comprising a switching system interconnecting a plurality of terminals, a first one of said terminals including a two-part indicator comprising a first part for identifying any one of said plurality of terminals and a second part for defining switch-hook status of at most one of said terminals, a second one of said terminals having a directory number and including a plurality of call appearances, said method comprising in response to an incoming call for said directory number, offering said call to said second terminal at an idle one of said plurality of call appearances, in response to expiration of a prespecified time period without receiving an acceptance for said offered call from said second terminal, determining switch-hook status of said second terminal and forwarding said call to said first terminal with a message including said second terminal switch-hook status, and in response to receipt of said message, said first terminal alerting and providing an indication with said two-part indicator for use in answering said call at said first terminal such that said first part identifies said second terminal and said second part defines said determined switch-hook status of said second terminal as identified by said first part.

24. A method in accordance with claim 23, wherein said first terminal further includes an alpha-numeric display to display call information, said display comprising said two-part indicator, wherein said step of providing an indication with said two-part indicator comprises displaying said directory number in said display to define said call as forwarded from said second terminal, and while displaying said directory number, displaying one string of characters in said display if said determined switch-hook status is off-hook and displaying another string of characters in said display if said determined switch-hook status is on-hook.

25. A method in accordance with claim 23, wherein said first terminal further includes an alpha-numeric display to display call information, said display comprising said two-part indicator, and said switching system stores name data associating a name with each of a plurality of directory numbers including said directory number of said second terminal, said method further comprising in response to said expiration, reading said name data to determine the name associated with said directory number of said second terminal, transmitting said determined name to said first terminal, and wherein said step of providing an indication with said two-part indicator comprises displaying said determined name in said display to identify said call as forwarded from said second terminal, and while displaying said determined name, displaying one string of characters in said display when said determined switch-hook status is off-hook and displaying another string of characters in said display when said determined switch-hook status is on-hook.

26. In an arrangement comprising a switching system connectable to a plurality of terminals, a method for providing call coverage for calls to directory numbers shared by key-system groups of said terminals, a first one of said terminals including an alpha-numeric display to display call information, a second one of said terminals including a plurality of call appearances and being a lead terminal for one of said key-system groups, said one key-system group sharing one of said directory numbers, and said first terminal being a member of said one key-system group and including a call appearance for said one directory number said method comprising in response to an incoming call for said one directory number, determining that said one key-system group shares said one directory number and determining that said second terminal is the lead terminal for said one key-system group,
in response to determining that said second terminal is the lead terminal for said one key-system group, offering said call for said one directory number to said second terminal at an idle one of said plurality of call appearances,
in response to determining that said second terminal is the lead terminal for said one key-system group, determining switch-hook status of said second terminal,
determining that one of the numbers of said one key-system group is said first terminal,
in response to determining that one of the members of said one key-system group is said first terminal, transmitting a message for said call to said first terminal, said message containing said determined switch-hook status of said second terminal,
in response to receipt of said switch-hook status of said second terminal, said first terminal alerting at said call appearance for said one directory number at said first terminal,
while alerting, said first terminal displaying in said display an identifier for said call appearance for said one directory number at said first terminal, and
while displaying said call appearance identifier, said first terminal indicating in said display said switch-hook status of said second terminal.

27. In an arrangement comprising a switching system connectable to a plurality of terminals, a method for providing call coverage for directory numbers shared by key-system groups of said terminals, a first one of said terminals including a two-part indicator comprising a first part for identifying any one of said plurality of terminals and a second part for defining switch-hook status of at most one of said terminals, a second one of said terminals including a plurality of call appearances and being a lead terminal for one of said key-system groups, said one key-system group sharing one of said directory numbers, said first terminal being a member of said one key-system group and including at least one call appearance for said one directory number, said method comprising
said first terminal transmitting a message to said switching arrangement requesting information for a call at said at least one call appearance,
in response to said message, said switching system determining that said call is associated with said second terminal,
in response to determining that said call is associated with said second terminal, said switching system determining switch-hook status of said second terminal,
said switching system transmitting to said first terminal said determined switch-hook status of said second terminal,
in response to receipt of said second terminal switch-hook status, said first terminal using said two-part indicator to provide an indication to a user of said first terminal such that said first part identifies said second terminal and said second part defines said determined switch-hook status of said second terminal as identified by said first part.

28. A method in accordance with claim 27 wherein said step of determining that said call is associated with said second terminal further comprises
said switching system determining that said at least one call appearance is a call appearance for said one directory number and determining that said second terminal is the lead terminal for said one key-system group that shares said one directory number.

29. A call coverage arrangement comprising
a plurality of terminal means for initiating and terminating calls,
switching means for selectively interconnecting said plurality of terminal means,
means, responsive to expiration of a prespecified time period without a given call being answered at a first one of said terminal means, for forwarding said given call to said second terminal means,
said first terminal means further comprising a plurality of call appearance means,
said switching means further comprising means, responsive to said expiration, for determining switch-hook status of said first terminal means and means for transmitting to a second one of said terminal means the switch-hook status determined by said determining means,
said second terminal means further comprising first means for identifying any one of said plurality of terminal means, second means for defining switch-hook status of at most one of said plurality of terminal means, and means responsive to receipt of switch-hook status of said first terminal means from said transmitting means for controlling said first means to identify said first terminal means and said second means to define said received switch-hook status.

30. A call coverage arrangement comprising
a plurality of terminal means for initiating and terminating calls,
switching means for selectively interconnecting said plurality of terminal means,
a first one of said terminal means further comprising a plurality of call appearance means,
said switching means further comprising means for determining switch-hook status of said first terminal means and means for transmitting to a second one of said terminal means the switch-hook status determined by said determining means,
said second terminal means further comprising first means for identifying any one of said plurality of terminal means, second means for defining switch-hook status of at most one of said plurality of terminal means, and means responsive to receipt of switch-hook status of said first terminal means from said transmitting means for controlling said first means to identifying said first terminal means and said second means to define said received switch-hook status,
wherein one of said call appearance means of said first terminal means is assigned a directory number,
wherein said second terminal means further comprises call appearance means assigned said directory number, and
wherein said switching means further comprises means, responsive to a call to said directory number, for controlling said determining means to determine switch-hook status of said first terminal means.

* * * * *